US009688466B2

(12) United States Patent
Ronstadt

(10) Patent No.: US 9,688,466 B2
(45) Date of Patent: Jun. 27, 2017

(54) VERTICALLY COLLAPSIBLE SEMI-TRUCK TRAILER

(71) Applicant: Elias Jordan Ronstadt, Houston, TX (US)

(72) Inventor: Elias Jordan Ronstadt, Houston, TX (US)

( * ) Notice: Subject to any disclaimer, the term of this patent is extended or adjusted under 35 U.S.C. 154(b) by 0 days.

(21) Appl. No.: 14/803,630

(22) Filed: Jul. 20, 2015

(65) Prior Publication Data

US 2016/0090234 A1    Mar. 31, 2016

Related U.S. Application Data

(60) Provisional application No. 62/055,292, filed on Sep. 25, 2014.

(51) Int. Cl.
*B65D 88/52* (2006.01)
*B62D 33/04* (2006.01)
(Continued)

(52) U.S. Cl.
CPC ............... *B65D 88/52* (2013.01); *B60J 5/08* (2013.01); *B60J 5/14* (2013.01); *B60J 7/165* (2013.01);
(Continued)

(58) Field of Classification Search
CPC ...... B65D 90/02; B65D 90/20; B65D 90/008; B65D 90/18; B65D 88/52; B65D 88/128;
(Continued)

(56) References Cited

U.S. PATENT DOCUMENTS 610,602 A    9/1898  Doldt
999,126 A    7/1911  Sistermann
(Continued)

FOREIGN PATENT DOCUMENTS

GB    2160851 A    1/1986
GB    2334241 A    8/1999
GB    2353275 A    2/2001
WO    2005037603 A1    4/2005

OTHER PUBLICATIONS

"The Box Semitrailer with Folding Wall," www.cargobull.com http://www.cargobull.com/en/Semitrailers-The-Box-Semitrailer-with-FoldingWall_25_203.html 1 page.
(Continued)

*Primary Examiner* — J. Allen Shriver, II
*Assistant Examiner* — Brian Cassidy
(74) *Attorney, Agent, or Firm* — Charles Knobloch; Arnold, Knobloch & Saunders, L.L.P.

(57) ABSTRACT

A collapsible container including frame assembly, a lifting mechanism, a retractable side wall, a retractable end wall, a top member, and a bottom member is disclosed. The frame assembly includes rectangular frame members and articulated vertical frame members disposed between the rectangular frame members. At least one rectangular frame member includes a receptacle member. The articulated vertical frame members are positioned and arranged to retract within the frame assembly. The lifting mechanism is positioned and arranged to elevate the rectangular frame members from each other. The retractable side wall is positioned and arranged to retract into a receptacle member. The retractable end wall is positioned and arranged to retract into a receptacle member. The top member is disposed on an uppermost rectangular frame member. The bottom member is disposed on a lowermost rectangular frame member. A method of transporting a plurality of containers is disclosed.

28 Claims, 12 Drawing Sheets

(51) Int. Cl.
*B62D 33/08* (2006.01)
*B62D 63/06* (2006.01)
*B65D 88/02* (2006.01)
*B65D 88/12* (2006.01)
*B65D 90/02* (2006.01)
*B65D 90/20* (2006.01)
*B60P 3/40* (2006.01)
*B60P 3/42* (2006.01)
*B65D 90/00* (2006.01)
*B60J 7/16* (2006.01)
*B60J 5/08* (2006.01)
*B60J 5/14* (2006.01)

(52) U.S. Cl.
CPC ...... *B60P 3/40* (2013.01); *B60P 3/42* (2013.01); *B62D 33/04* (2013.01); *B62D 33/08* (2013.01); *B62D 63/061* (2013.01); *B65D 88/022* (2013.01); *B65D 88/128* (2013.01); *B65D 90/0086* (2013.01); *B65D 90/02* (2013.01); *B65D 90/021* (2013.01); *B65D 90/20* (2013.01)

(58) Field of Classification Search
CPC ....... B65D 88/022; B65D 88/005; B60P 3/42; B60P 3/40; B62D 63/061; B62D 33/08; B62D 33/04
USPC ......................................................... 220/1.5
See application file for complete search history.

(56) References Cited

U.S. PATENT DOCUMENTS

| | | | |
|---|---|---|---|
| 2,483,332 A | 9/1949 | Brumbaugh | |
| 2,944,852 A | 7/1960 | Snyder | |
| 3,085,707 A * | 4/1963 | Tantlinger | B60P 1/6418 206/512 |
| 3,155,419 A | 11/1964 | Garson et al. | |
| 3,612,330 A * | 10/1971 | Baer | B65D 88/524 220/1.5 |
| 3,664,459 A | 5/1972 | Stephens et al. | |
| 3,765,556 A * | 10/1973 | Baer | B65D 88/022 220/1.5 |
| 3,799,384 A | 3/1974 | Hurkamp | |
| 3,849,952 A * | 11/1974 | Hanaoka | E04B 1/3445 52/426 |
| 4,112,634 A | 9/1978 | Bissinger | |
| 4,214,669 A | 7/1980 | McQuiston | |
| 4,491,449 A | 1/1985 | Hawkins | |
| 4,577,772 A * | 3/1986 | Bigliardi | B65D 88/121 220/1.5 |
| 4,606,570 A | 8/1986 | Neumann | |
| 4,630,746 A * | 12/1986 | Fortenberry | B65D 19/18 220/1.5 |
| 4,646,928 A * | 3/1987 | Ono | B65D 88/524 220/1.5 |
| 4,695,087 A | 9/1987 | Hollrock | |
| 4,726,486 A * | 2/1988 | Masuda | B65D 88/524 220/1.5 |
| 4,848,618 A * | 7/1989 | Yuan | B65D 88/524 220/1.5 |
| 4,946,214 A | 8/1990 | Neumann et al. | |
| 5,107,639 A * | 4/1992 | Morin | E04B 1/3445 220/6 |
| 5,190,179 A * | 3/1993 | Richter | B65D 90/008 220/1.5 |
| 5,297,653 A | 3/1994 | Wurtz et al. | |
| 5,462,188 A * | 10/1995 | Yurgevich | B65D 90/0013 206/511 |
| 5,509,559 A * | 4/1996 | Okano | B65D 7/26 220/1.5 |
| 5,564,523 A | 10/1996 | Howard | |
| 5,761,854 A | 6/1998 | Johnson et al. | |
| 6,269,963 B1 * | 8/2001 | Hall | B65D 88/121 220/1.5 |
| 6,460,653 B1 | 10/2002 | Hardy et al. | |
| 6,761,387 B2 | 7/2004 | Sloss | |
| 6,945,743 B2 | 9/2005 | Sherman et al. | |
| 7,014,238 B2 | 3/2006 | Gonzalez | |
| 7,052,033 B2 | 5/2006 | McDonell | |
| 7,296,704 B2 * | 11/2007 | Ferrini | B65D 88/522 220/1.5 |
| 7,455,312 B2 | 11/2008 | Senatore | |
| 7,703,632 B2 | 4/2010 | Kochanowski | |
| 7,722,101 B2 * | 5/2010 | Bellehumeur | B66C 1/663 220/1.5 |
| 7,770,913 B2 | 8/2010 | Cannon | |
| 7,793,599 B2 * | 9/2010 | Truksa | A47B 43/00 108/145 |
| 7,823,739 B2 * | 11/2010 | Sadkin | B65D 88/524 220/1.5 |
| 7,870,970 B2 * | 1/2011 | Fisk | B65D 88/022 220/4.28 |
| 7,882,973 B2 * | 2/2011 | Krohn | B65D 88/12 220/1.5 |
| 7,931,164 B2 * | 4/2011 | Krohn | B65D 88/522 220/1.5 |
| 7,984,819 B1 * | 7/2011 | Davis | B65D 88/524 220/1.5 |
| 8,113,372 B2 * | 2/2012 | Bellehumeur | B65D 88/524 220/1.5 |
| 8,240,495 B2 * | 8/2012 | Ronci | B65D 90/008 220/1.5 |
| 8,388,017 B2 | 3/2013 | Alexander | |
| 8,469,215 B2 * | 6/2013 | Giesbers | B65D 88/524 220/1.5 |
| 8,646,638 B2 * | 2/2014 | Buskermolen | B65D 88/522 220/1.5 |
| 8,783,489 B2 * | 7/2014 | Bellehumeur | B65D 88/524 220/1.5 |
| 9,022,242 B2 * | 5/2015 | Meijers | B65D 88/52 220/6 |
| 9,045,280 B2 * | 6/2015 | Bellehumeur | B65D 88/524 |
| 9,108,758 B2 * | 8/2015 | Brennan, Jr. | B65D 88/524 |
| 9,181,024 B2 * | 11/2015 | Kochanowski | B65D 88/524 |
| 9,211,998 B2 * | 12/2015 | Buskermolen | B65D 88/522 |
| 9,221,599 B2 * | 12/2015 | Brennan, Jr. | B65D 90/08 |
| 2003/0222431 A1 | 12/2003 | Crosby et al. | |
| 2004/0140305 A1 * | 7/2004 | Okumura | B65D 88/524 220/6 |
| 2004/0232146 A1 * | 11/2004 | Kessler | B65D 7/26 220/6 |
| 2006/0016807 A1 * | 1/2006 | Hsu | B65D 90/0006 220/1.5 |
| 2007/0108204 A1 * | 5/2007 | Warhurst | B65D 7/26 220/6 |
| 2010/0018967 A1 | 1/2010 | Schrayvogel | |
| 2012/0006816 A1 * | 1/2012 | Turnquist | B65D 88/524 220/4.33 |
| 2012/0013093 A1 | 1/2012 | Frank et al. | |
| 2014/0144907 A1 * | 5/2014 | Giesbers | B65D 88/524 220/1.5 |
| 2014/0238979 A1 * | 8/2014 | Chen | B65D 90/008 220/1.5 |
| 2015/0266666 A1 * | 9/2015 | Wong | B65D 88/524 220/1.5 |

OTHER PUBLICATIONS

"Amazing New Shipping Container Folds Flat in 30 Seconds" treehugger.com http://www.treehugger.com/cars/amazing-new-shipping-container-folds-flat-in-30-seconds.html 7 pages.
"Another Amazing Collapsible Shipping Container: The Staxxon" treehugger.com http://www.treehugger.com/cars/another-amazing-collapsible-shipping-container-thestaxxon.html 4 pages.
"Flat rack shipping container" directindustry.com http://www.directindustry.com/prod/sea-box/flat-rack-shipping-containers-21921-1397169.html 15 pages.

(56) References Cited

OTHER PUBLICATIONS

"40FT Side wall Van trailer with two/three axles" Alibaba.com http://www.alibaba.com/product-detail/40FT-Side-wall-Van-trailer-with_240118905.html 2 pages.
"Koegel Multi—The platform semi-trailer for weather-resistant freight" Koegel.com http://www.koegel.com/en/products/forwarding-industry/platform-trailers/multi/ 3 pages.
International search report based on International Application No. PCT/US2015/045094, form PCT/ISA/210, Nov. 6. 2015, 2 pages.
Written opinion of the international searching authority based on International Application No. PCT/US2015/045094, form PCT/ISA/237, Nov. 6, 2015, 7 pages.
Notification of transmittal of International preliminary report on patentability base on International Application No. PCT/US2015/045094, form PCT/IPEA/416 and PCT/IPEA/416, Jun. 10, 2016, 11 pages.

\* cited by examiner

VERTICALLY COLLAPSIBLE SEMI-TRUCK TRAILER

CROSS REFERENCE TO RELATED APPLICATIONS

This application claims the benefit of U.S. Provisional Application 62/055,292, filed Sep. 25, 2014.

BACKGROUND OF THE INVENTION

1. Field of the Invention

Examples of the subject matter disclosed herein generally relate to apparatus, methods and systems for collapsing the vertical height of a container, methods for transport thereof, in particular apparatus, methods and systems for a vertically collapsible semi-truck trailer.

BRIEF SUMMARY OF THE INVENTION

In a set of examples, an apparatus is disclosed for a collapsible container including frame assembly, a lifting mechanism, a retractable side wall, a retractable end wall, a top member, and a bottom member.

In a set of examples, an apparatus is disclosed for a self-erecting collapsible container, the container having: a frame assembly including a plurality of rectangular frame members having a longitudinal length and a width; and a plurality of articulated vertical frame members disposed between the rectangular frame members; where at least one rectangular frame member includes a receptacle member in the length direction; where at least one rectangular frame member includes a receptacle member in the width direction; where the articulated vertical frame members are positioned and arranged to retract to within the frame assembly; a lifting mechanism positioned and arranged to elevate the rectangular frame members from each other; a retractable side wall positioned and arranged to retract into the receptacle member in the length direction; a retractable end wall positioned and arranged to retract into the receptacle member in the width direction; a top member disposed on an uppermost rectangular frame member of the frame assembly; and a bottom member disposed on a lowermost rectangular frame member of the frame assembly.

In one example, the lifting mechanism is disposed along the length direction of the rectangular frame members.

In one example, the top member is pre-engineered to receive at least one additional frame assembly.

In one example, the container is attached to a trailer. In one example, the trailer is a semi-truck trailer. In one example, the container is removably attachable to the trailer. In one example, the container frame assembly is integrated into the trailer. In one example, the lowermost rectangular frame member is integrated into a trailer assembly.

In one example, the frame assembly is attached to a railcar assembly or goods wagon, configured and arranged for transportation of goods via railways.

In one example, the frame assembly is attached to a box truck assembly.

In one example, a portion of the lifting mechanism is disposed outside of a perimeter of the frame assembly.

In one example, further included is at least one lock member positioned and arranged to lock the rectangular members of the frame assembly in place when in a collapsed position.

In one example, the lifting mechanism comprises a receptacle for receiving power to actuate the lifting mechanism. In one example, the receptacle for receiving power is disposed on one end of the apparatus.

In a set of examples, disclosed is a method of transporting a plurality of containers, the method including: stacking one or more containers on a transportation vehicle, and moving the transportation vehicle. One or more of the stacked containers is a vertically collapsible container in a collapsed position. At least one of the vertically collapsible containers includes: a frame assembly including a plurality of rectangular frame members having a longitudinal length and a width; and a plurality of articulated vertical frame members disposed between the rectangular frame members; where at least one rectangular frame member comprises a receptacle member in the length direction; where at least one rectangular frame member comprises a receptacle member in the width direction; where the articulated vertical frame members are positioned and arranged to retract to within the frame assembly; a lifting mechanism positioned and arranged to elevate the rectangular frame members from each other; a retractable side wall positioned and arranged to retract into the receptacle member in the length direction; a retractable end wall positioned and arranged to retract into the receptacle member in the width direction; a top member disposed on an uppermost rectangular frame member of the frame assembly; and a bottom member disposed on a lowermost rectangular frame member of the frame assembly.

In one example, at least one stacked container is integrated into the transportation vehicle.

DETAILED DESCRIPTION

Figure 1:
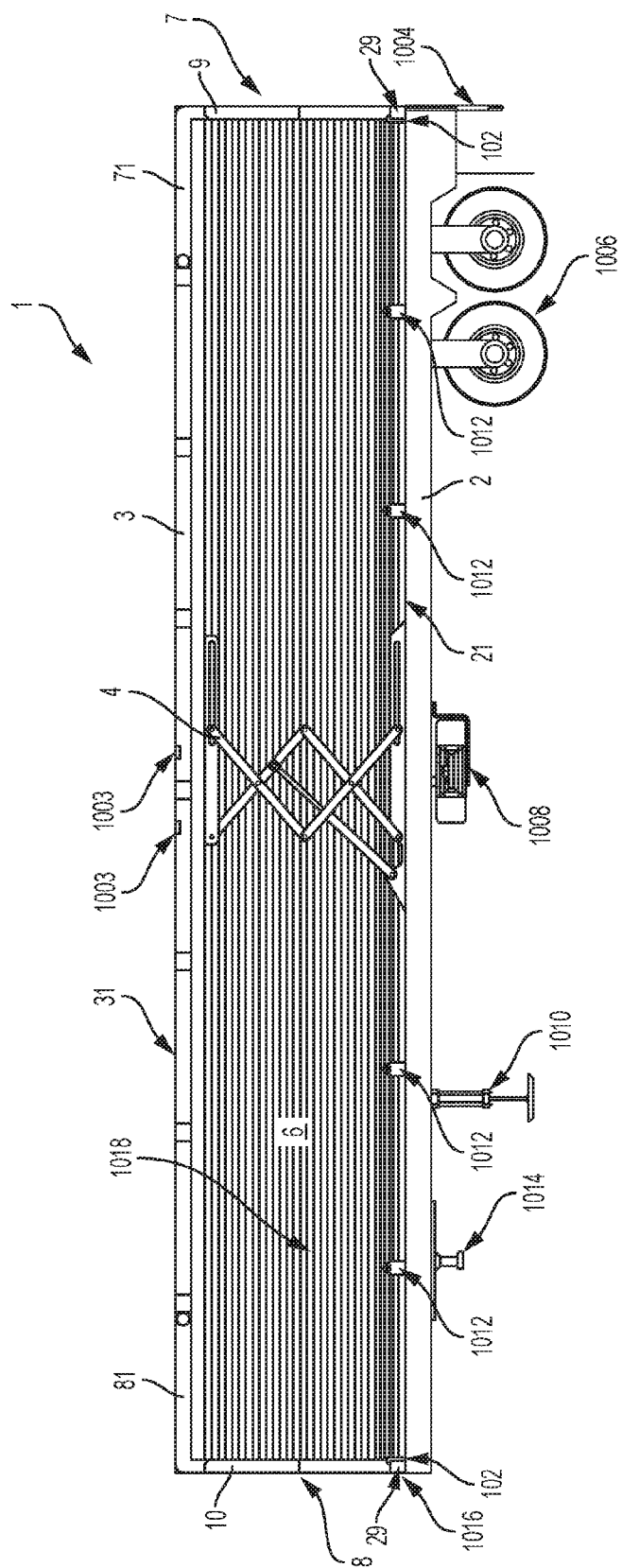
FIG. 1 illustrates a side view of an example of the vertically collapsible trailer in extended position, with near side wall cut-away to show interior mechanism.

U.S. Provisional Application 62/055,292 of filing date Sep. 25, 2014 is hereby incorporated herein by reference.

The long haul trucking and container industries are the backbone of nearly all intermodal transportation worldwide. Nearly all cargo transported is done so using one of these two methods.

With regards to the trucking industry, a considerable amount of time and money is spent transporting empty semi-trailers either back to their original location, or to a different location to be reloaded or swapped out for a different type of trailer to handle a different type of cargo. The lack of versatility in the use of a single trailer fails to meet the growing desire for complete intermodalization within the industry.

The ability to collapse a cargo trailer into a flatbed will increase the flexibility of the of the company operating the trailer. Types of cargoes that would require a flatbed trailer may now be transported on the same trailer, reducing the need for purchasing and operating multiple types of trailers by the operators. The concept of the collapsing trailer allows for owners to move multiple empty trailers across the country, with greater storage flexibility and lower overall cost in terms of fuel and miles traveled. In addition the reduction in air drag by converting an empty semi-trailer into a flatbed when the trailer must be transported empty will reduce fuel consumption costs. The ability to stack containers and/or trailers will reduce consumption of valuable space in storage yards.

In one set of examples, disclosed is a vertically collapsible semi-truck trailer for towing by a semi-truck cab, with four sides, a cargo bed floor, a cargo trailer roof/flatbed floor, and a mechanical lifting mechanism. The long side walls roll to open or close the sides (in one example, they roll upward into a box at the top of the trailer box; in another example, they roll downward into a box at the bottom of the trailer box). In one example, the walls dispose into a receptacle or similar storage space. The rear door and forward end roll upward into a horizontal track (in one example they fold inwards using hinges and joints). The remaining frame collapses inward to allow the cargo trailer roof to become the flatbed floor. The mechanical lifting mechanism in the side walls control the lowering of the top frame of the trailer (as, or after, the side walls have been rolled and the end walls have rolled upwards).

In one example of the self-erecting collapsible container portion, the container conforms to international standards of size, shape and weight requirements set forth for shipping containers. In one example, the container conforms to International Organization for Standardization (ISO) ISO 668 (2013) series 1 freight containers for classification dimensions and ratings. In one example, lengths of containers vary from 8 to 56 feet (2.438 to 17.069 meters) and heights from 8 feet (2.438 meters) to 9 feet 6 inches (2.896 m). In one example, the container conforms to International Organization for Standardization (ISO) ISO 668 (2013) for classification, dimensions and ratings of intermodal shipping containers. In one example, the container conforms to International Organization for Standardization (ISO) ISO 6346 (1995) for coding, identification and marking of intermodal shipping containers. In one example of the self-erecting collapsible container the frame assembly is attached to a trailer assembly meeting the standards set forth by the trucking regulatory agency in which the trailer is operating. A division of the U.S. Department of Transportation (DOT), the Federal Motor Carrier Safety Administration (FMCSA) regulates nearly all aspects of the trucking industry including length, width, and height limits. At present, there is no federal height limit, and states may set their own limits which range from 13 feet 6 inches (4.11 m) (mostly on the east coast) to 14 feet (4.3 m) (west coast). As a result, the majority of trucks are somewhere between 13 feet 6 inches (4.11 m) and 14 feet (4.3 m) high. The Federal Bridge Gross Weight Formula (also known as Bridge Formula B and the Federal Bridge Formula) dictates that the federal gross weight limit for a Class 8 truck is 80,000 pounds (36,000 kg) (combined weight of truck, trailer, and cargo). In one example of the self-erecting collapsible container portion, the container conforms to United States or individual State standards of size, shape and weight requirements set forth for shipping containers. In one example of the self-erecting collapsible container portion, the container conforms to Mexico standards of size, shape and weight requirements set forth for shipping containers. In one example of the self-erecting collapsible container portion, the container conforms to Canada standards of size, shape and weight requirements set forth for shipping containers. In one example of the self-erecting collapsible container portion, the container conforms to the standards of size, shape and weight requirements set forth for shipping containers for the country where the container will be used.

In one example, also included is one or more vertical height locking mechanisms to relieve the scissor jack when in the (full-vertical) extended position.

In one example, the top/roof of the collapsible semi-truck trailer has one or more risible "nubs" or risible twist locks to receive bottom sockets of a shipping container (enabling a shipping container to ride on top of the collapsed flat bed and locked in place).

In one example, sockets for twist locks to receive shipping containers are also disposed on the top/roof of the collapsible semi-truck trailer. In one example, the top member is pre-engineered to receive at least one additional frame assembly, in one example, of another container or collapsible container disposed on the top.

In one alternate example, the end walls fold inward instead of rolling inwards.

In one alternate example, the disclosure herein is used for constructing collapsible shipping containers instead of collapsible semi-truck trailers having a collapsible container portion.

In one alternate example, the disclosure herein is used for constructing collapsible Box trucks instead of collapsible semi-truck trailers.

In one alternate example, the disclosure herein is used for constructing collapsible rail cars instead of collapsible semi-truck trailers.

In one alternate example, the disclosure herein is used for constructing small personal trailers for towing behind personal vehicles instead of collapsible semi-truck trailers.

In one example, the mechanical lifting mechanism is a hydraulic arm or any other type of mechanical lifting device instead of a scissor lift system. In one example, the motor that operates the mechanical lifting mechanism is located outside the trailer. In one example, the motor that operates the mechanical lifting mechanism is located underneath the trailer. In one example, a barrier separates the enclosing cargo space from the mechanical lifting mechanism. In one example, the mechanical lifting mechanism is operated manually with a hand crank or other similar device.

FIG. 1 illustrates a side view of an example of the vertically collapsible trailer 1 in extended position, with near side wall cut-away to show interior mechanism. In this FIG. 1, the nearest one of two retractable sidewalls 6 is removed (cut-away) to enable illustration of the interior of far sidewall 6 and enclosing cargo space 1018.

In one example, the cargo space is a weather tight area in which the cargo being shipped is contained. In one example, this area is surrounded by two side walls, a forward wall, an after door and a trailer roof. In one example, when in the collapsed position, this area is inaccessible and weather tight. In one example, a folding portion of the frame on the after end of the trailer folds inwards as the trailer goes to the collapsed position.

In one example, a long sidewall is disposed on one or both sides of the container/trailer which, in one example, utilizes a slatted wall which can roll either, in one example, upwards or, in one example, downwards into a barrel. In one example, the collapsed position the side wall will be completely retracted into the rolling barrel.

In one example, integrated into trailer 1 is a self-erecting collapsible container, the container having: a frame assembly including a plurality of frame members 2, 3 having a longitudinal length and a width; and a plurality of articulated vertical frame members 9, 10 disposed between the rectangular frame members 2, 3; where at least one rectangular frame member 3 comprises a receptacle member 61 in the length direction (shown in FIG. 11); where at least one rectangular frame member comprises a receptacle member 71, 81 in the width direction; where the articulated vertical frame members 9, 10 are positioned and arranged to retract to within the frame assembly; a lifting mechanism 4 is positioned and arranged to elevate the rectangular frame members 2, 3 from each other; a retractable side wall 6 is positioned and arranged to retract into the receptacle member in the length direction; a retractable end wall 7, 8 positioned and arranged to retract into the receptacle member 71, 81 in the width direction (shown in FIG. 12); a top member 31 disposed on an uppermost rectangular frame member 3 of the frame assembly; a bottom member 21 disposed on a lowermost rectangular frame member 2 of the frame assembly.

In one example, rectangular frame members 2, 3 are horizontally disposed relative to vertical frame members 9, 10 when frame members 9, 10 are in the extended (elevated, non-retracted) vertical position.

In one example, frame member 2 integrates with a trailer, providing support of the entire trailer and connecting the major components together for supporting the weight of the cargo. In one example, the frame assembly meets the standards of the trucking regulatory agency in which the trailer is being operated as well as being able to support the weight a standard trailer or flatbed trailer would typically support. In one example, bottom member 21 includes a floor of the internal cargo space which, in one example, will support the cargo stored while the trailer is being used in the expanded mode. In one example, while the trailer is in the collapsed mode this floor will be inaccessible.

In this example, retractable end wall 7 and articulated vertical frame member 9 are positioned at the longitudinal rear end of trailer 1. Retractable end wall 8 and articulated vertical frame member 10 are positioned at the longitudinal front end of trailer 1. Rear retractable end wall 7 retracts into receptacle member 71. In like manner, rear retractable end wall 8 retracts into receptacle member 81. Therefore, in one example, a portion of the trailer either or both fore and aft allows for the entrance of the rolling end wall into an upper portion of the cargo space along, in one example, horizontal tracks.

In one example, tracks are located on either side of the trailer body in which the after rolling door and forward rolling wall can run along to conceal them. In one example, a rolling track entrance is provided, opening into an area where the rolling door bends, in one example, into the horizontal tracks along the top of the cargo space.

In one example of a retractable forward end wall, a rolling wall secures the forward end of the cargo space when the trailer is in the raised position. In one example, this is achieved with an upward rolling door either, in one example, into a barrel or, in one example, into horizontal tracks along the underside of the trailer roof. In one example, this is achieved with an inward folding door. In one example of the self-erecting collapsible container, the end walls are positioned and arranged to fold in the inward direction. In one example, doors that fold inwards comprise a series of hinged panels. In one example, a refrigeration or air conditioning unit is attached to (or, in one example capable of being attached to) this panel for a climate-controlled trailer.

In one example, the after end of the cargo trailer is made up of two non-folding portions of the rear door. In one example, this connection is weatherproof and the cargo space will not be accessible in the collapsed position.

An enclosing cargo space 1018 is formed with lifting mechanism 4 in the extended position, elevating rectangular frame members 2, 3 from each other.

In one example, also included is a locking mechanism to lock the frame assembly in place when in the collapsed position. In one example, the locking mechanism is attached to the lower frame. In one example, the locking mechanism is also a support for the frame in the collapsed position. In one example, the locking mechanism is attached to the upper most frame or, in one example, the vertical frames or, in one example, the lifting mechanism. In one example, a locking mechanism is provided to prevent the rolling walls or, in one example, the rolling end walls to prevent them from unrolling when in the collapsed position. In one example, at least one lock member is disposed on the uppermost rectangular frame member. In one example, at least one lock member is disposed on at least one of the plurality of articulated vertical frame members. In one example, at least one lock member is positioned and arranged to lock the retractable side wall in place when the frame assembly is in a collapsed position. In one example, the at least one lock member is disposed on the retractable side wall. In one example, a mechanical locking mechanism is included for the trailer to keep it in the collapsed position. This locking mechanism, in one example, is disposed elsewhere on the trailer. In one example, the locking mechanism for the frame is operated mechanically or manually. In one example, the locking mechanism is operated manually. In one example, the locking mechanism is automatic. In one example, the locking mechanism is operable either manually or automatically.

In one example of the self-erecting collapsible container, a vertical height locking member is positioned and arranged to immobilize at least one of the plurality of articulated vertical frame members when the articulated vertical frame members are in a fully extended vertical position. In one example, the locking member is attached in the middle of the folding frames or, in one example, at the top or, in one example, located in the lifting mechanism itself. In one example, the locking mechanism is operated manually. In one example, the locking mechanism is automatic. In one example, the locking mechanism is operable either manually or automatically.

In one example, locking mechanisms 1012 serve to removably affix the rectangular frame members 2, 3 to each other when in the collapsed position. In one example, a mechanical locking mechanism is provided for the trailer to keep it in the collapsed position. In one example, a locking mechanism is provided for the frame which can either be operated mechanically or manually. In one example, locking mechanisms 1012 provide compressive strength to support frame member 3 resting over frame member 2. This locking mechanism, in one example, is a manual mechanism located elsewhere on the trailer. Vertical frame bottom hinge 102 enables articulation of the articulated vertical frame members 9, 10. In one example where more than two rectangular frame members are used, locking mechanisms are disposed to removably affix one or more pairs of rectangular frame members.

In the example as illustrated, both front and rear end walls 7, 8 have corresponding receptacles 71, 81 for stowage. In one example, the receptacles include an area where the rolling door bends, in one example, into horizontal tracks along the top of the cargo space. In other examples, one or more end or side walls are fixed and do not use a stowage receptacle. In one example, tracks are located on either side of the trailer body in which the after rolling door and forward rolling wall can run along to conceal them.

In one example, the end wall includes a rolling door that allows access to the cargo space when the trailer is in the raised position. In one example, the rear portion of flatbed trailer, in the collapsed position, is approximately one fourth the size of the expanded unit. In one example, the collapsed rear portion is made up of two non-folded portions of the rear door, which seal the cargo space from weather.

Other components are shown in the illustrated example of FIG. 1 to show relative positioning and arrangement of the trailer-container components in the example where a trailer assembly or trailer components are combined with the collapsible container cargo space. Rear Tires and Tandem Axle 1006 are disposed under frame 2 toward the longitudinal rear portion of the container. In one example, the rear axle and components connect the tires to the frame of the trailer. In one example, the tire and axle combination meets the standards of the trucking regulatory agency in which the trailer is being operated as well as be able to support the weight that a standard trailer or flatbed trailer could support. Landing gear 1010 is disposed under frame 2 toward the longitudinal front third portion of the trailer. In one example, the landing gear are extendable legs for the trailer to be supported when not connected to a truck. In one example, the landing gear meet the standards of the trucking regulatory agency in which the trailer is being operated. A king pin 1014 is shown disposed under frame 2, further towards the front portion of the trailer from landing gear 1010. In one example, king pin 1014 is a nipple at the front of the trailer to connect to a fifth wheel coupling on the tractor unit. In one example, king pin 1014 meets the standards of the trucking regulatory agency in which the trailer is being operated.

A spare tire compartment 1008 is disposed under frame 2, midway between rear tires 1006 and landing gear 1010. In one example, the compartment meets the standards of the trucking regulatory agency in which the trailer is being operated. A rear bumper 1004 is disposed on the longitudinal rear end of the container-trailer combination. In one example, a rear portion of the trailer frame contains the lights and reflection materials, as well as any other components required to meet the standards of the trucking regulatory agency in which the trailer is being operated. A port 1016 for electrical and air connections are disposed on the longitudinal front end of the container-trailer combination.

In further examples, it can be appreciated that the vertically collapsible container is separate from or independent of trailer components or trailer assembly. The illustration of FIG. 1 shows an example of the vertically collapsible container attached to, or otherwise integrated with, trailer assembly components. In one example of the self-erecting collapsible container portion, the frame assembly is attached to a trailer assembly.

In one example, the frame assembly of the vertically collapsible container is load bearing, enabling vertical stacking of containers in either the expanded or the collapsed positions. In one example of the self-erecting collapsible container portion, the frame assembly is pre-engineered to be capable of bearing a load when in the collapsed position. In one example the cover supports close to, or more, the same weight as a standard flatbed semi-trailer. In one example, the container supports the maximum stack limits that a normal 40 foot or 20 foot shipping container can support. In one example, the container portion supports placing one or more trailers on the top of the container, for example, a trailer bearing a collapsed container carries a trailer on the top of the collapsed container.

Figure 2:
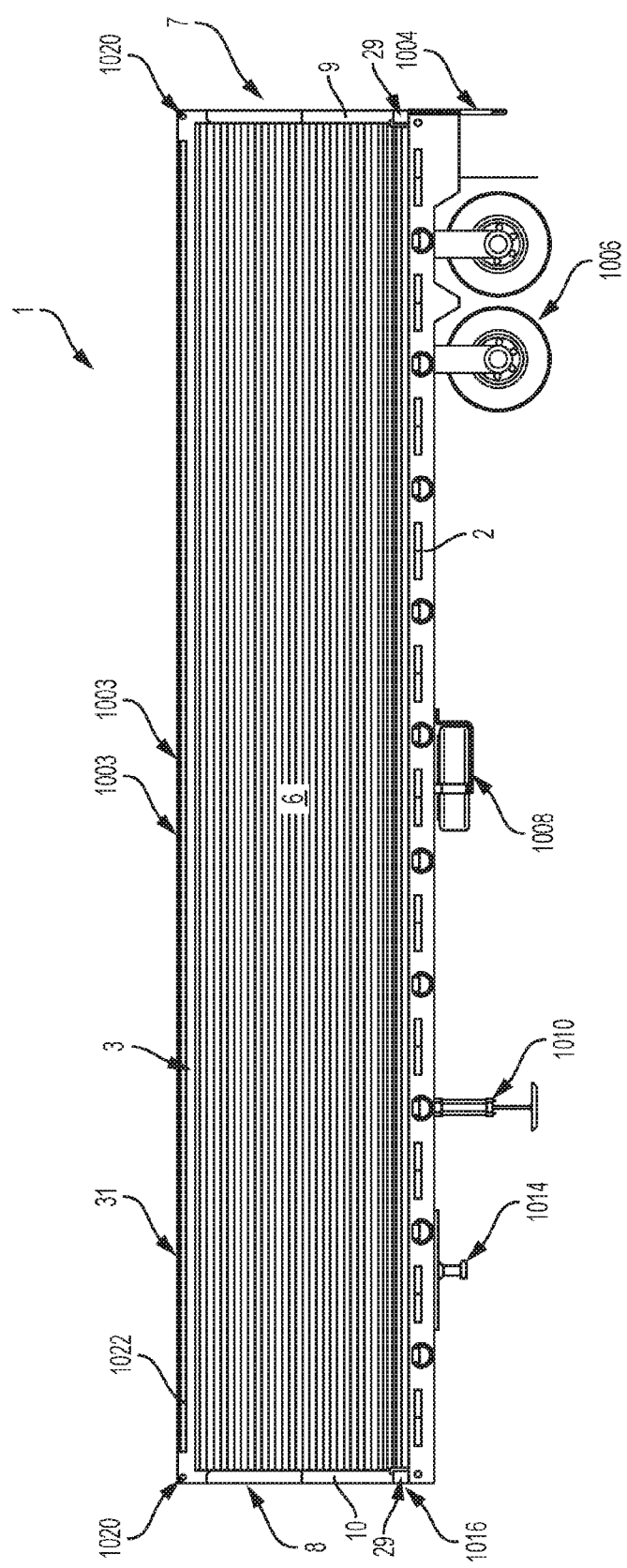
FIG. 2 illustrates a side view of an example of the vertically collapsible trailer in extended position.
Figure 11:
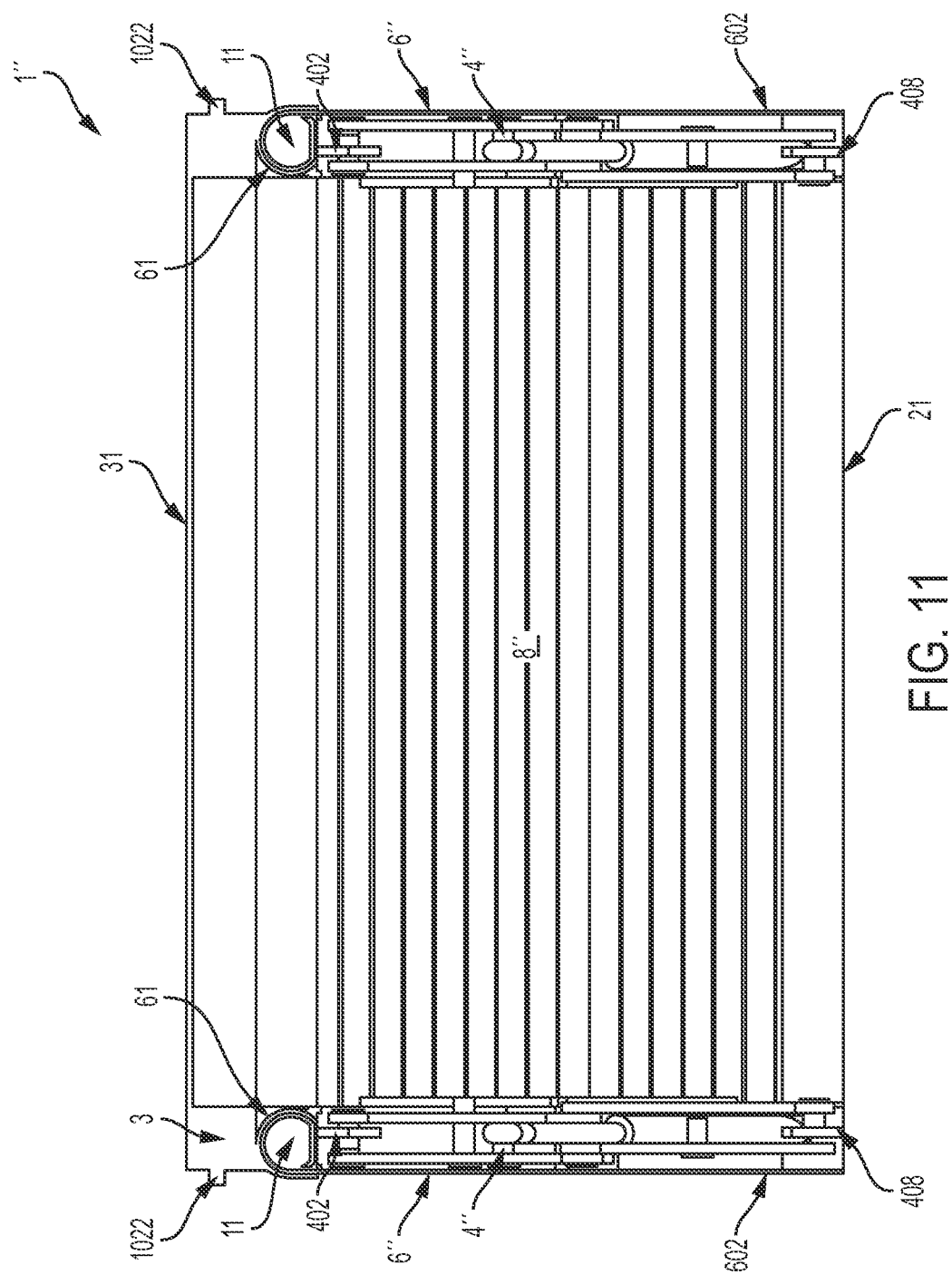
FIG. 11 illustrates a rear facing view of an example of the vertically collapsible trailer in a partially collapsed position, with the rear end cut away to show placement of an example lifting mechanism.

FIG. 2 illustrates a side view of an example of the vertically collapsible trailer 1 with its container in an extended position. In FIG. 2, the near retractable side wall 6 is shown in the closed position. In the open position, in one example, side wall 6 is stowed in a receptacle 61 in frame member 3 (FIG. 11). In this example, side wall 6 rolls up to provide an opening into cargo space 1018 (FIG. 1). In one example, receptacle 61 is disposed in an alternate rectangular frame member, such as, for example, lowermost frame member 2. In that example, side wall 6 rolls down to provide opening into cargo space 1018 (FIG. 1).

As in FIG. 1, FIG. 2 shows location of retractable end wall sides 7, 8 and articulated vertical frame members 9, 10. Rear retractable end wall 7 retracts into receptacle member 71 (FIG. 1). In like manner, rear retractable end wall 8 retracts into receptacle member 81 (FIG. 1).

Other components are shown in the illustrated example of FIG. 2 to show relative positioning and arrangement of the trailer-container components in the example where a trailer assembly or trailer components are combined with the collapsible container cargo space. Rub rail 1022 is shown disposed along the length of the exterior of rectangular frame 3. In one example, railing disposed along the cargo trailer roof, or flatbed floor, allows for attachment of straps for securing cargo when the trailer is in the collapsed position. In one example, the railing contains stake pockets for the placement of side stakes for further securing of cargo. In one example, contains or also contains ratchet cylinders as well as, in one example, other devices for securing cargo as per the need of the user and, in one example, in accordance with the requirements set forth by the trucking regulatory agency where the trailer is being operated. In one example, contains or also contains winch straps as well as, in one example, other devices for securing cargo as per the need of the user and, in one example, in accordance with the requirements set forth by the trucking regulatory agency where the trailer is being operated.

In one example a twist lock corner casting 1020 is disposed in the corners of the upper rectangular frame 3. In one example, castings 1020 enable affixing a second container unto the top of frame 3. In one example, twist locks provision for the carrying of a 40-foot shipping container. In one example, castings are placed in different positions along the side of the trailer depending on the length of the trailer. In one example, additional castings are added, positioned and arranged, to accommodate two 20-foot shipping containers. In one example, castings are designed to contain a rising nub or, in one example, a rising twist lock.

In one example, twist locks to receive shipping containers are also disposed on the top/roof of the collapsible semi-truck trailer or container. A standard twist lock (ISO 1161 [1984], for example) attaches at the bottom of a container and the top of the one below it. The twist lock can be attached and removed via the sockets built into the container. In one example, the sockets are disposed on the upper most rectangular frame member (and lower most if being used as a shipping container) spaced at 20 foot and 40 foot increments to accommodate standard shipping containers, for example, if a user uses their own twist locks to attach them. In one example, at least one socket is disposed on the uppermost rectangular frame member, the at least one socket configured to receive a twist lock for receiving shipping containers. In a further example, the frame assembly is attached to a trailer assembly.

In one example, the twist lock corner castings are engineered for the carrying of a 40-foot shipping container via the use of twist locks. In one example, these castings are placed in different positions along the side of the trailer, depending on the length of the trailer. In one example, additional castings are added to accommodate two 20-foot shipping containers. In one example, these castings are engineered to contain a rising nub or, in one example, a rising twist lock. In one example, for the collapsible container used as a shipping container, castings are disposed on the lowermost rectangular frame member. This enables the bottom of the container to be attached to the top of another container, or floor of a trailer, or deck, or other structure designed for receiving containers.

In one example, Rear Tires and Tandem Axle 1006 are disposed under frame 2 toward the longitudinal rear portion of the container. Landing gear 1010 is disposed under frame 2 toward the longitudinal front third portion of the trailer. A king pin 1014 is shown disposed under frame 2, further towards the front portion of the trailer from landing gear 1010. A spare tire compartment 1008 is disposed under frame 2, midway between rear tires 1006 and landing gear 1010. A rear bumper 1004 is disposed on the longitudinal rear end of the container-trailer combination. A port 1016 for electrical and air connections are disposed on the longitudinal front end of the container-trailer combination.

In one example, forklift slots 1003 are disposed on the uppermost or top frame 3. In this example, a forklift or other external lifting device engage the slots. In this way, the container or container-trailer combination can be extended or collapsed using an external lifting means, separate from or in addition to the lifting means provided by the container or container-trailer combination. In one example, two slots on either side of the trailer are available for raising and lowering the container-trailer by the use of a forklift, for example, no power source is available or in the event of a failure of the mechanical lifting mechanism.

In one example, twist-lock corner castings 1020 are used to extend or collapse using an external lifting means, separate from or in addition to the lifting means provided by the container or container-trailer combination.

In one example, a spreader or crane (e.g., by one of various devices such as crane wire, bar, hook systems that are used globally to lift a container off the ground) use castings 1020, which in turn raise or lower the collapsible container portion. In one example, in case of a failure of the lifting mechanism, the lifting and locking mechanisms are overridden and operated either manually or automatically to allow for the use of an external lifting mechanism.

In one example, rub rails 1022 are used to extend or collapse using an external lifting means, separate from or in addition to the lifting means provided by the container or container-trailer combination.

In one example, top member 31 is disposed on the uppermost portion of top frame 3, forming a ceiling or roof. In one example, top member 31 forms a supporting structural floor on top of collapsible container portion of trailer 1. In one example, top member 31 forms a cargo trailer roof. In one example, top member 31 forms a flatbed floor. In one example, top member 31 is the top side of the cargo area that, in one example, in the collapsed position becomes the floor of the flatbed trailer allowing for the transportation of larger items, shipping containers, and/or other loads. In one example, top member 31 supports as closely as possible the weight that a standard flatbed trailer can support. In one example, a refrigeration or air conditioning unit is attached to this top member.

Figure 3:
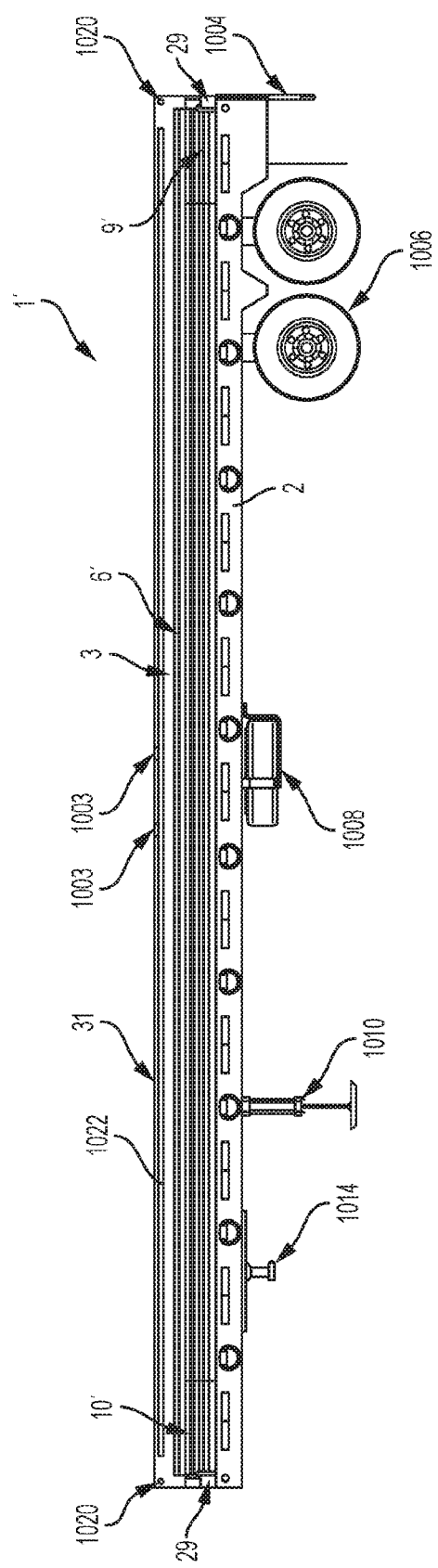
FIG. 3 illustrates a side view of an example of the vertically collapsible trailer in collapsed position.

FIG. 3 illustrates a side view of an example of the vertically collapsible trailer 1' in collapsed position.

In FIG. 3, the near retractable side wall 6' is retracted and stowed into its receptacle 61 (shown in FIG. 11). Rear collapsible vertical frame 9' in now in a collapsed position, resting behind side wall 6' in this view. In a like manner, front collapsible vertical frame 10' in now in a collapsed position, resting behind side wall 6' in this view (shown in FIG. 8).

In one example, locking mechanisms 1012 (shown in FIG. 1) secure frame 2 to frame 3 when in the collapsed position.

In one example, forklift slots 1003 are disposed on the uppermost or top frame 3. In this example, a forklift or other external lifting device provides an external means for lifting or collapsing the collapsible frame. In this way, the container or container-trailer combination can be extended or collapsed using an external lifting means, separate from or in addition to the lifting means provided by the container or container-trailer combination.

Other components are shown in the illustrated example of FIG. 3 to show relative positioning and arrangement of the trailer-container components in the example where a trailer assembly or trailer components are combined with the collapsible container cargo space. Rub rail 1022 is shown disposed along the length of the exterior of rectangular frame 3. In one example, a twist lock corner casting 1020 is disposed in the corners of the upper rectangular frame 3. In one example, castings 1020 enable affixing a second container unto the top of frame 3. Rear Tires and Tandem Axle 1006 are disposed under frame 2 toward the longitudinal rear portion of the container. Landing gear 1010 are disposed under frame 2 toward the longitudinal front third portion of the trailer. A king pin 1014 is shown disposed under frame 2, further towards the front portion of the trailer from landing gear 1010. A spare tire compartment 1008 is disposed under frame 2, midway between rear tires 1006 and landing gear 1010. A rear bumper 1004 is disposed on the longitudinal rear end of the container-trailer combination.

In one example, top member 31 is disposed on the uppermost portion of top frame 3, forming a ceiling or roof. In one example, top member 31 forms a supporting structural floor on top of collapsible container portion of trailer 1'. In one example, top member 31 is configured to provide a platform surface for receiving additional loads. In one example, top member 31 receives one or more containers. In one example, top member 31 receives one or more collapsible containers. In one example, top member 31 receives one or more vertically collapsible containers as described herein. In one example, top member 31 receives a combination of containers and collapsible containers. In one example, top member 31 receives a trailer. In one example, top member 31 receives a vertically collapsible trailer.

In one example, a vertically collapsible container is configured for supporting additional vertically collapsible containers. In one example, a stack of three or four collapsed vertically collapsible containers are placed on a trailer for transportation, eliminating the need for four trucks hauling the four empty containers. In one example, a vertically collapsible trailer receives one or more additional containers, or vertically collapsible containers, either collapsed or expanded. Again, the need for multiple trucks is reduced. In one example, a vertically collapsible trailer in the collapsed position receives a load. In one example, a stack of three or four collapsed vertically collapsible containers are transported as one unit.

Figure 4:
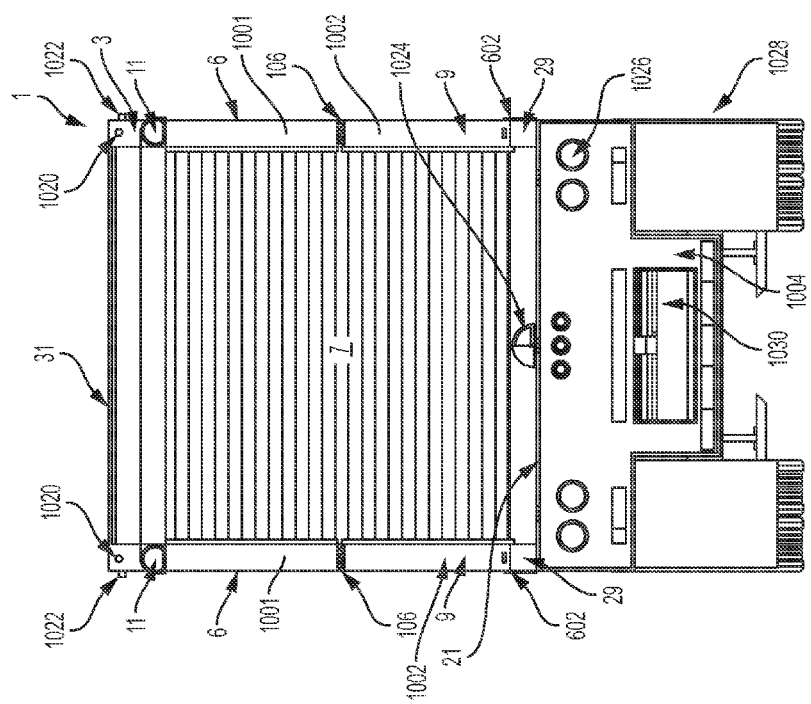
FIG. 4 illustrates a rear end view of an example of the vertically collapsible trailer in extended position.

FIG. 4 illustrates a rear end view of an example of the vertically collapsible trailer 1 in extended position.

FIG. 4 shows location of retractable side wall sides 6 and rolling sidewall barrel 11 in the side wall receptacles. Rear articulated vertical frame assemblies 9 are disposed on each right and left side of the rear side. In one example, vertical frame assemblies 9 rest on a stand-off 29 of frame 2. Vertical frame center hinge 106 is disposed, in this example, mid way along the extended length of articulated vertical frame assembly 9. As frame 3 collapses towards frame 2, vertical frame hinge member 106 serves to enable articulated vertical frame members of vertical frame assembly 9 to retract vertically by extending longitudinally.

In one example, a side wall member 602 is affixed on the exterior side of bottom frame 2. In one example, a portion of the rolling sidewall opposite the sidewall barrel where it is connected to, in one example, the trailer frame or, in one example, the flatbed railing depending on the direction in which the sidewall rolls when collapsing the trailer. In one example, side wall member 602 provides an exterior facing for a portion of the side of the container/trailer that is not covered by the retractable side wall.

Rear retractable end wall 7 retracts into receptacle member 71. In like manner, forward retractable end wall 8 retracts into receptacle member 81. In one example, the end wall serving the purpose of a door, the collapsed position of the rolling or retractable door allows access to the cargo space when the trailer is in the raised position. In one example, the retractable door is an upward rolling door either, in one example, rolling into a barrel or, in one example, retracting into horizontal tracks along the underside of the trailer roof. In one example, an inward folding door serves as a retractable end wall. In one example, the after end of cargo trailer in the collapsed position, in one example, is made up of two non-folding portions of a rear door. In one example, this connection is weatherproof and the cargo space is not accessible in this position.

In one example, door locking mechanism 1024 is disposed on end wall 7 to enable locking of end wall 7 to frame 2. In one example, a manual mechanism is disposed for locking the rear door of the trailer. In one example, the manual mechanism provided for locking the rear door of the trailer to the trailer frame is operated to open the door in the expanded position.

In one example, top member 31 is disposed on the uppermost portion of top frame 3, forming a ceiling or roof. In one example, top member 31 forms a supporting structural floor on top of collapsible container portion of trailer 1.

In one example, a cylindrical rolling mechanism is disposed in the receptacle into which the sidewall will roll into when converting into the collapsed position and out of when being expanded. In one example, the barrel is on the upper end of the side wall or, in one example, the lower and the sidewall will roll upwards or downwards accordingly.

Other components are shown in the illustrated example of FIG. 4 to show relative positioning and arrangement of the trailer-container components in the example where a trailer assembly or trailer components are combined with the collapsible container cargo space. Rub rail 1022 is shown disposed along the length of the exterior of rectangular frame 3. In one example a twist lock corner casting 1020 is disposed in the corners of the upper rectangular frame 3. In one example, castings 1020 enable affixing a second container unto the top of frame 3. Rear Tires 1028 of Rear Tires and Tandem Axle 1006 (FIG. 1-3) are disposed under frame 2 toward the longitudinal rear portion of the container. A rear bumper 1004 is disposed on the longitudinal rear end of the container-trailer combination. Rear lights 1026 are shown disposed on rear bumper 1004 under frame 2 as part of the trailer. Axle 1030 of Rear Tires and Tandem Axle 1006 (FIG. 1-3) is visible behind the rear bumper 1004 in this example.

Figure 5:
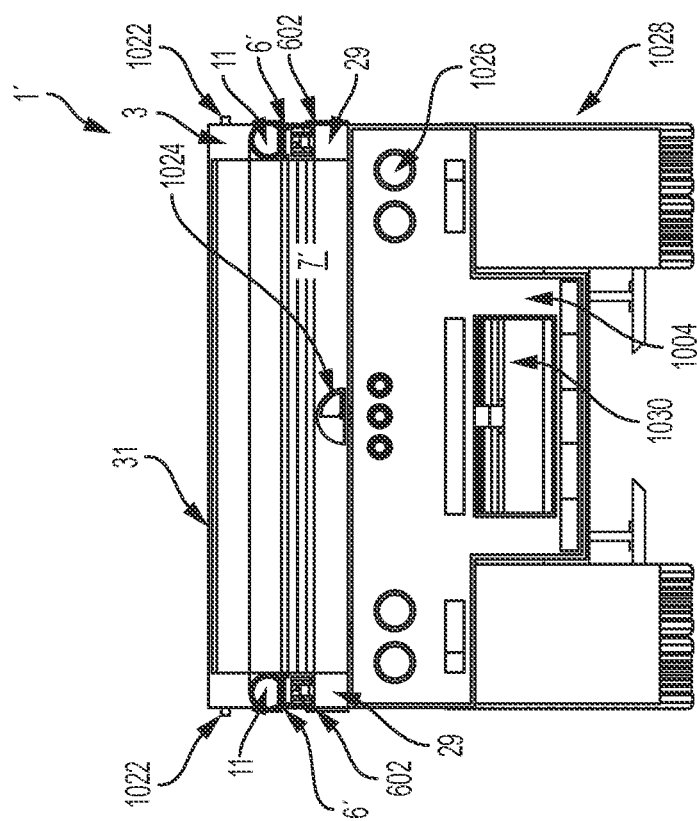
FIG. 5 illustrates a rear end view of an example of the vertically collapsible trailer in collapsed position.

FIG. 5 illustrates a rear end view of an example of the vertically collapsible trailer 1' in collapsed position.

FIG. 5 shows location of retractable side wall sides 6' and rolling sidewall barrel 11 in the side wall receptacles. In this example, the retracted side wall side members 6' are stowed by rolling onto rolling sidewall barrel 11. In one example, long sidewall is disposed on both sides of trailer which, in one example, utilizes a slatted wall which can roll either, in one example, upwards or, in one example, downwards into a barrel. In one example, cylindrical rolling mechanism is disposed into which the sidewall will roll into when converting into the collapsed position and out of when being expanded. In one example, the barrel may be on the upper end of the side wall or, in one example, the lower and the sidewall will roll upwards or downwards accordingly.

As frame 3 is lowered towards frame 2, several wall and vertical frame components which are deployed in the raised position are now stowed in the remaining space between the bottom and the top frame members.

In one example, a side wall member 602 is affixed on the exterior side of bottom frame 2.

Rear retractable end wall 7' is refracted into its respective receptacle member.

In one example, door locking mechanism 1024 is disposed on retractable end wall 7' to secure end wall 7' to frame 2.

Other components are shown in the illustrated example of FIG. 5 to show relative positioning and arrangement of the trailer-container components in the example where a trailer assembly or trailer components are combined with the collapsed container cargo space. Rub rail 1022 is shown disposed along the length of the exterior of rectangular frame 3. Rear Tires 1028 of Rear Tires and Tandem Axle 1006 (FIG. 1-3) are disposed under frame 2 toward the longitudinal rear portion of the container. A rear bumper 1004 is disposed on the longitudinal rear end of the container-trailer combination. Rear lights 1026 are shown disposed on rear bumper 1004 under frame 2 as part of the trailer. Axle 1030 of Rear Tires and Tandem Axle 1006 (FIG. 1-3) is visible behind the rear bumper 1004 in this example.

Figure 6:
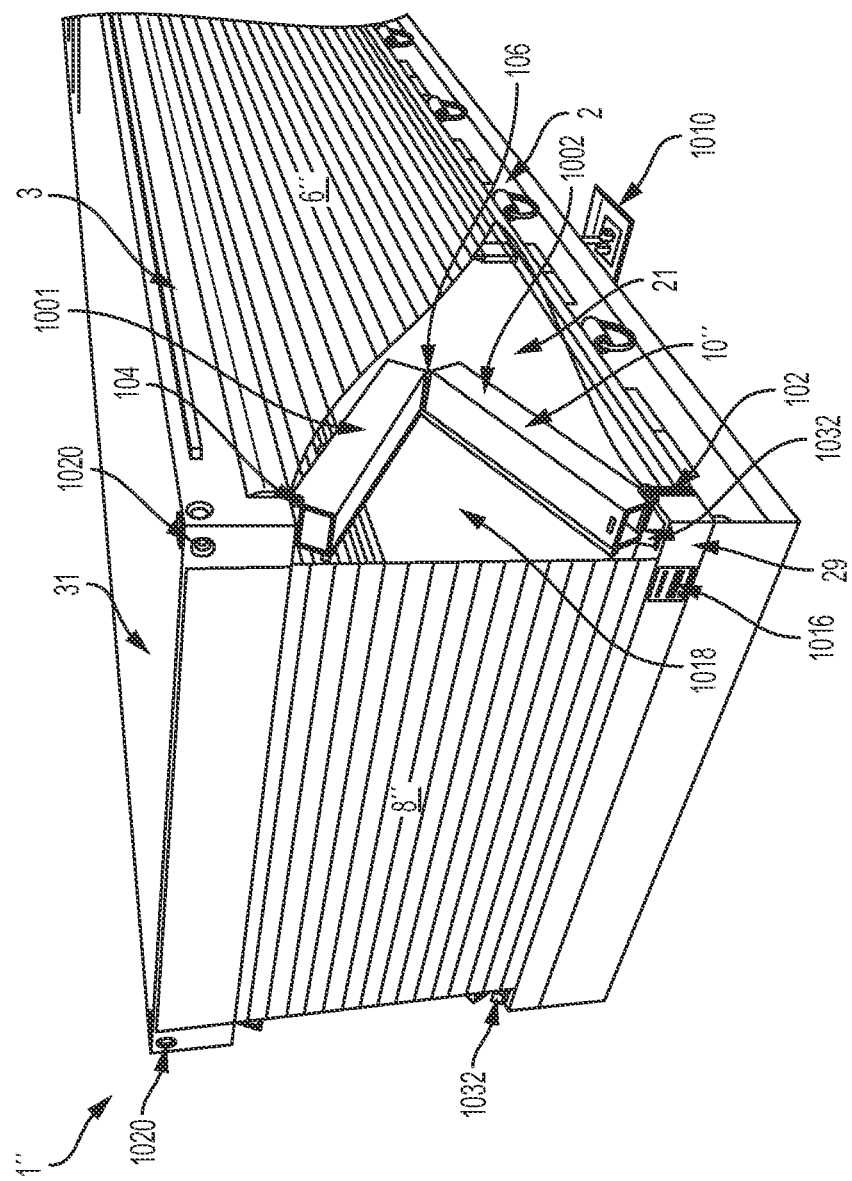
FIG. 6 illustrates a 3-D perspective view from forward end corner of an example of the vertically collapsible trailer in a partially collapsed position, with cut away of the near side wall.

FIG. 6 illustrates a 3-D perspective view from forward end corner of an example of the vertically collapsible trailer 1" in a partially collapsed position, with cut away of the near side wall 6". The cut away enables viewing of the enclosed cargo space 1018 and cargo space floor 21.

In one example, the cargo space floor supports the cargo stored while the trailer is being used in the expanded mode. In one example, while the trailer is in the collapsed mode, this floor will be inaccessible.

Forward Collapsible Vertical Frame 10" in this example is shown in a partially collapsed position to show the action of stowing the vertical frame members 1001, 1002 as top frame 3 is lowered towards bottom frame 2. In one example, the folding portion of the frame on the forward end of the trailer has folded inwards as the trailer goes to the collapsed position. To accomplish this, in one example, vertical frame assembly 10" includes two vertical members 1001, 1002 attached by a hinge 106 that is positioned and arranged to enable the two members to articulate. In one example, the frame members 1001, 1002 of frame assembly 10" are square or rectangular or polygon posts of desired length, the square or rectangular or polygon shape in the cross section. The vertical members 1001, 1002 rotate relative to each other about hinge 106, enabling an external side of each of members 1001, 1002 to approach each other. As members 1001, 1002 articulate about hinge 106, the members rotate from a vertical position to a more horizontal position.

In one example, an upper hinge on each side of the trailer frame allows for the collapsing of the container portion of trailer. Thus the upper hinges provide for the folding of the forward and after frames of the container/trailer.

The top of the vertical frame assembly 10" is attached by a hinge 104 to top frame 3. In one example, these upper folding hinges enable folding of the forward and after Frames of the trailer. In one example, these upper hinges are disposed on each side of the trailer frame enabling the collapsing of the container portion of the trailer. The hinge 104 is positioned and arranged to enable the top member of frame assembly 10" to articulate from top frame 3. In one example, hinge 104 is disposed on a side wall of the polygon shaped cross section of the frame member 1001 that is opposite from the disposed side wall of hinge 106, enabling the top frame member 1001 to articulate upward, rotating towards top frame 3 as top frame 3 lowers.

The bottom of the vertical frame assembly 10" is attached by a hinge 102 to bottom frame 2. The hinge 102 is positioned and arranged to enable the bottom member 1002 of frame assembly 10" to articulate from bottom frame 2. In one example, hinge 102 is disposed on a side wall of the polygon shaped cross section of the frame member 1002 that is opposite from the disposed side wall of hinge 106, enabling the bottom frame member 1002 to articulate downward, rotating towards bottom frame 2 as top frame 3 lowers. In one example, the center-folding hinge is disposed on the forward and after vertical frames of the trailer. In one example, the center hinge is disposed on both the right and left sides of the rear door.

In one example, the center hinges are for the folding of the forward and after vertical frames of the trailer. In one example, center hinges for the folding of the forward and after portions of the trailers vertical frame are located on both the right and left sides of the rear door.

In one example, bottom frame 2 includes a corner stand-off 29 to support frame assembly 10" in the extended, upright vertical position. Hinge 102 is attached to the stand-off 29, the stand-off provisioning vertical height space for stowage of the lower member 1002 of frame assembly 10".

As illustrated in this example, hinge 102 includes a J-slide to enable the hinge pin to translate the lower frame member 1002 of frame assembly 10" down to meet bottom frame 2 for horizontal stowage.

In one example, the lower sliding hinge is disposed on each side of the trailer frame, which allows for the collapsing of the trailer.

In one example, a frame locking mechanism 1032 is disposed on bottom frame 2 and/or lower frame member 1002 of frame assembly 10". Locking mechanism 1032 secures frame assembly 10" when frame assembly 10" is in the upright position, for example, when the container portion of the trailer assembly is in the fully extended position.

In one example, the forward portion of flatbed trailer collapses to approximately one fourth the size of the expanded unit. In one example, the forward wall is made up of two non-folded portions of the forward panel, which seal the cargo space from weather.

Other components are shown in the illustrated example of FIG. 6 to show relative positioning and arrangement of the trailer-container components in the example where a trailer assembly or trailer components are combined with the collapsible container cargo space. Landing gear 1010 is disposed underneath lower frame 2 to support trailer assembly 1" at a desired elevation.

Power Source and Air Hose Connections 1016 are disposed on an end side of bottom frame 2 in one example. In one example, connections are located on the forward end of the trailer. In one example, this is where the power connections for the mechanical lifting component, locking mechanism, trailer lights and/or any other electronic components are located. In one example, this connects to the power from the tractor unit as well as external power sources, such as electrical cords to power outlets, terminal power supplies, etc. In one example, this also contains a control panel for operating the collapsing and expanding of the trailer.

Figure 7:
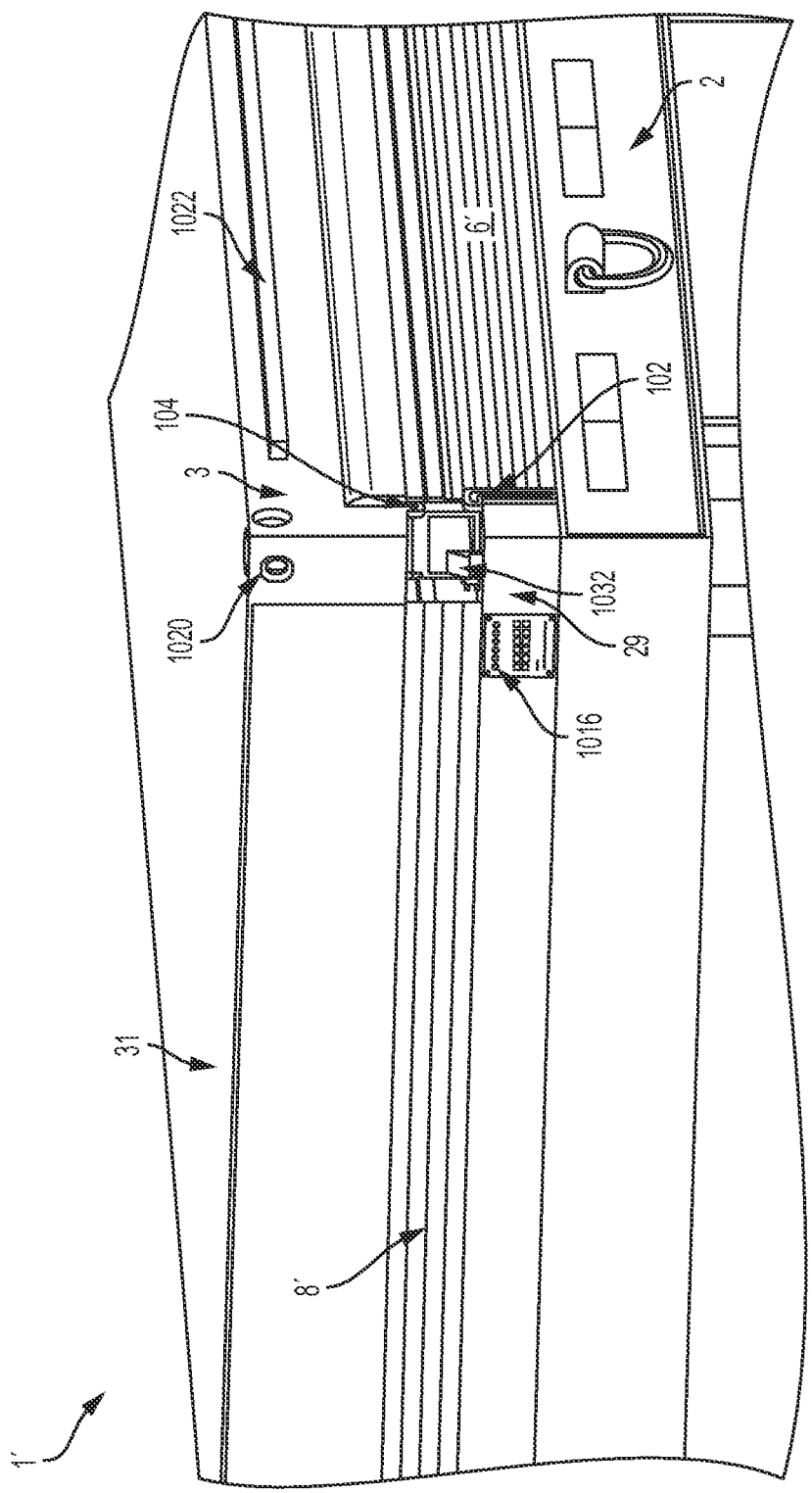
FIG. 7 illustrates a 3-D perspective partial view from the forward end corner of an example of the vertically collapsible container portion of the trailer in a collapsed position.

FIG. 7 illustrates a 3-D perspective partial view from the forward end corner of an example of the vertically collapsible container portion of trailer 1' in a collapsed position.

In this example, top frame 3 has lowered towards bottom frame 2 with vertical frame assembly members now stowed. In this example, a portion of the rolling sidewall 6' is shown deployed with the remainder of the sidewall stowed, in one example, by rolling into space contained within the top and bottom frames 2, 3. In this example, a portion of the forward rolling wall 8' is shown deployed with the remainder of the forward wall stowed, in one example, by rolling into space contained within the top and bottom frames 2, 3.

In one example, forward rolling wall 8' is stowed in a receptacle in top frame 2. In one example, forward rolling wall 8' is stowed in a receptacle in bottom frame 3.

The top of the vertical frame assembly is attached by a hinge 104 to top frame 3. As seen in this example, the top member of the vertical frame assembly has articulated from top frame 3 into a horizontal stowed position within the top and bottom frames 2, 3.

The bottom of the vertical frame assembly is attached by a hinge 102 to bottom frame 2. The hinge 102 is positioned and arranged such that the bottom member of the frame assembly is articulated from bottom frame 2 into a horizontal stowed position within the top and bottom frames 2, 3. In this example, the bottom member of the frame assembly rests stowed beneath the stowed top member of the vertical frame assembly.

In one example, as illustrated, bottom frame 2 includes a corner stand-off 29 to support the vertical frame assembly in the extended, upright vertical position. Hinge 102 is attached to the stand-off 29, the stand-off provisioning vertical height space for stowage of a lower member of the vertical frame assembly.

As illustrated in this example, hinge 102 includes a J-slide to enable the hinge pin to translate a lower frame member of the vertical frame assembly down to meet bottom frame 2 for horizontal stowage.

In one example, a frame locking mechanism 1032 is disposed on bottom frame 2 and/or the lower frame member of the frame assembly. Locking mechanism 1032 secures the frame assembly when the frame assembly is in the upright position, for example, when the container or trailer assembly is in the fully extended position. In one example, as illustrated, locking mechanism 1032 is a spring tab affixed to bottom frame 2 and unconnected to the vertical frame member when in the collapsed, stowed position. In one example, locking mechanism 1032 is a clasp.

Other components are shown in the illustrated example of FIG. 7 to show relative positioning and arrangement of the trailer-container components in the example where a trailer assembly or trailer components are combined with the collapsible container cargo space. Rub rail 1022 is shown disposed along the length of the exterior of rectangular frame 3. In one example, a twist lock corner casting 1020 is disposed in the upper corners of frame 3, enabling stacking of containers. In this example, the twist lock corner castings 1020 removably affix another container on top of the container trailer 1'. In one example, power Source and Air Hose Connections 1016 are disposed on an end side of bottom frame 2 in one example. An edge view of the cargo space floor 21 is also illustrated.

Figure 8:
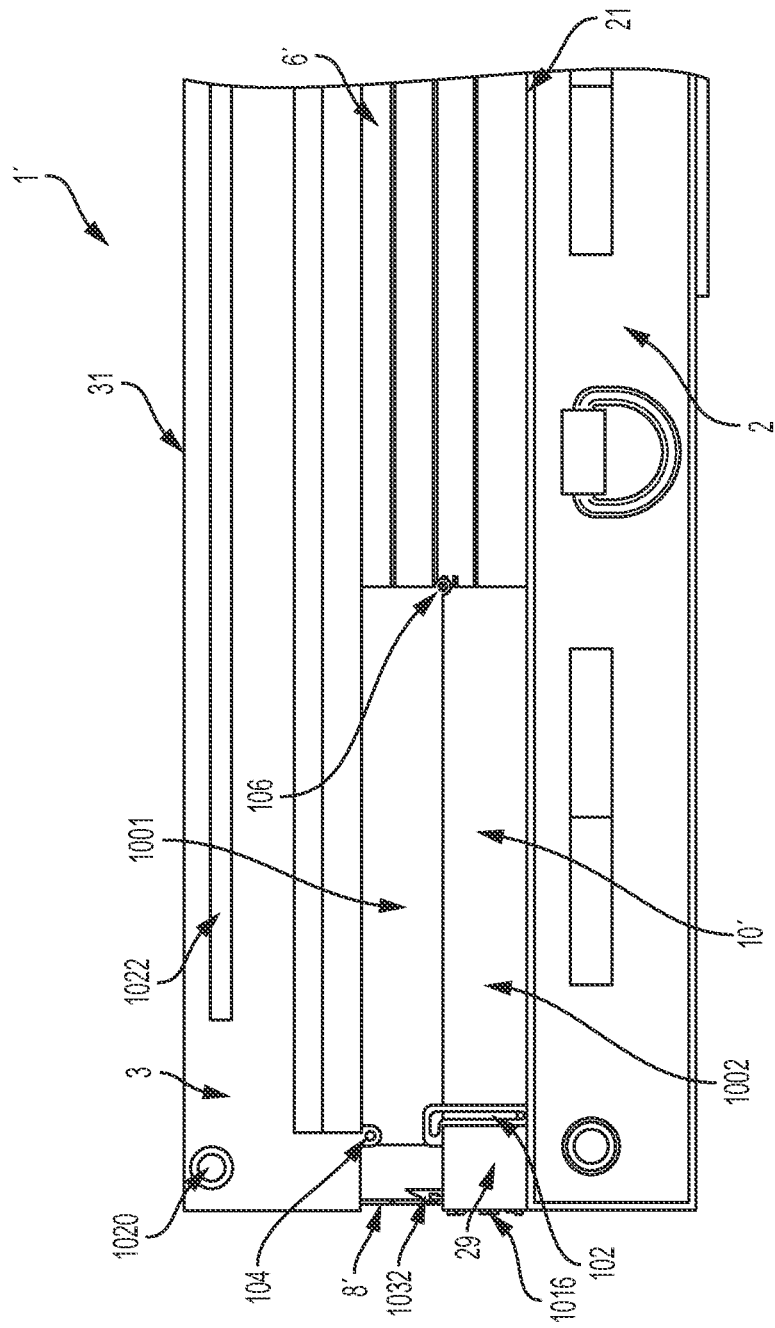
FIG. 8 illustrates a partial forward end side view of an example of the container portion of the vertically collapsible trailer in collapsed position.

FIG. 8 illustrates a partial forward end side view of an example of the container portion of the vertically collapsible trailer in collapsed position 1'.

In this example, top frame 3 has lowered towards bottom frame 2 with vertical frame assembly members now stowed. In this example, a portion of the rolling sidewall 6' is shown deployed with the remainder of the sidewall stowed, in one example, by rolling into space contained within the top and/or bottom frames 2, 3. In one example, rolling sidewall 6' is stowed in a receptacle in top frame 2. In one example, rolling sidewall 6' is stowed in a receptacle in bottom frame 3. Rolling sidewall 6' is partially cut away in this Figure to show the stowed vertical frame assembly 10', comprising a top vertical frame member 1001 and a bottom vertical frame member 1002. In this example, a portion of the forward rolling wall 8' is shown in edge view, deployed with the remainder of the forward wall stowed, in one example, by stowing into space contained within the top and/or bottom frames 2, 3.

Hinges 102, 104, and 106 of the vertical frame assembly 10' are shown by cut-away of rolling sidewall 6'.

The top of the vertical frame assembly is attached by a hinge 104 to top frame 3. As seen in this example, the top member 1001 of the vertical frame assembly has articulated from top frame 3 into a horizontal stowed position within the top and bottom frames 2, 3.

The bottom of the vertical frame assembly is attached by a hinge 102 to bottom frame 2. The hinge 102 is positioned and arranged such that the bottom member 1002 of the frame assembly is articulated from bottom frame 2 into a horizontal stowed position within the top and bottom frames 2, 3. In this example, the bottom member 1002 of the frame assembly rests stowed beneath the stowed top member 1001 of the vertical frame assembly.

Hinge 106 is disposed on the top member 1001 and bottom member 1002 of vertical frame assembly 10'. In one example, as illustrated, hinges 102 and 104 are disposed on one end each of respective top 1001 and bottom 1002 frame members. Hinge 106 is disposed on the opposite end of the top 1001 and bottom 1002 frame members, the end opposite to hinges 102, 104. In one example, hinge 106 is disposed on a side of the top 1001 and bottom 1002 frame members that is opposing or opposite to the side of attachment of hinges 102, 104. Thus, in the collapsed stowed position, vertical frame assembly 10' is stowed horizontal and within top and bottom frames 2, 3. In this example, the top vertical frame member 1001 rests horizontally on top of the horizontally lying bottom vertical frame member 1002, having articulated into that position by rotation about hinge 106. One edge of the top vertical frame member 1001 of vertical frame assembly 10' remains rotationally attached to top frame 3 by way of hinge 104. One edge of the bottom vertical frame member 1002 remains rotationally attached to bottom frame 2 by way of hinge 102. In one example, as illustrated, bottom frame 102 includes a corner stand-off 29 to support frame assembly 10' in the extended, upright vertical position. Hinge 102 is attached to the stand-off 29, the stand-off provisioning vertical height space for stowage of the lower member 1002 of the vertical frame assembly 10'.

As illustrated in this example, hinge 102 includes a J-slide to enable the hinge pin to translate the lower frame member 1002 of the frame assembly 10' down to meet bottom frame 2 for horizontal stowage.

In one example, one or both frame members 1001, 1002 stow into a receiving space within bottom or top frames 2, 3.

In one example, a plurality of vertical frame assemblies are deployed, in further example, at least one vertical frame assembly for each corner of the container portion of the trailer. In this way, the container space is vertically formed by extension of the vertical frame assemblies such that top frame 3 is extended vertically upward from bottom frame 2.

In the various examples, the articulated vertical frame members 1001, 1002 of vertical frame assemblies 10' and top rectangular frame 3 and bottom rectangular frame 2 form a container frame assembly. The articulated vertical frame members 1001, 1002 of vertical frame assemblies 10' are positioned and arranged to retract to within the collapsing container frame assembly as frame 3 is lowered towards frame 2.

In one example, one or more additional horizontal frames are inserted between bottom frame 2 and top frame 3. One or more vertical frame assemblies are inserted in between each adjacent pair of the horizontal frames.

In one example, a frame locking mechanism 1032 is disposed on bottom frame 2 and/or the lower frame member 1002 of the frame assembly. Locking mechanism 1032 secures the frame assembly when the frame assembly is in the upright position, for example, when the container or trailer assembly is in the fully extended position. In one example, as illustrated, locking mechanism 1032 is a spring tab affixed to bottom frame 2 and unconnected to the vertical frame member in the collapsed, stowed position. In one example, locking mechanism 1032 is a clasp.

Other components are shown in the illustrated example of FIG. 8 to show relative positioning and arrangement of the trailer-container components in the example where a trailer assembly or trailer components are combined with the collapsible container cargo space. Rub rail 1022 is shown disposed along the length of the exterior of rectangular frame 3. In one example, a twist lock corner casting 1020 is disposed in the upper corners of frame 3. In this example, the twist lock corner castings 1020 removably affix a container on top of the container portion of trailer 1'. In one example, power Source and Air Hose Connections 1016 are disposed on an end side of bottom frame 2.

Figure 9:
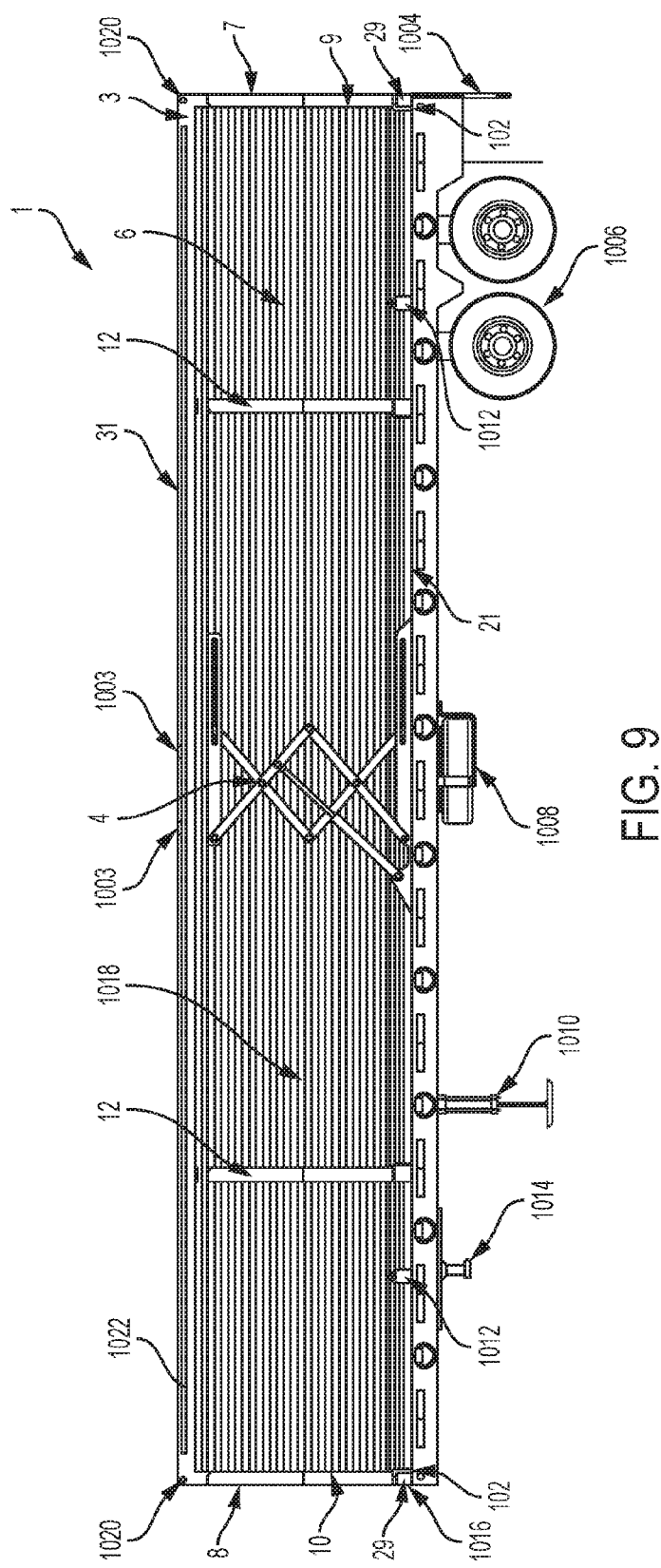
FIG. 9 illustrates a side view of an example of the vertically collapsible trailer in extended position, with near side wall cut-away to show interior mechanism, showing example additional sidewall frames.

FIG. 9 illustrates a side view of an example of the vertically collapsible trailer 1 in extended position, with near side wall cut-away to show interior mechanism, showing example additional sidewall frames. In this view, the enclosed cargo space 1018 is revealed as well as the interior side of the distal rolling sidewall 6.

In the illustrated orientation, rolling rear door 7 is positioned on the right edge of the container portion of trailer 1 and forward rolling wall 8 is position on the left edge of the container portion of trailer 1. A forward end collapsible vertical frame assembly 10 is disposed in extended position on the forward corner of the container portion of trailer 1, between bottom frame 2 and top frame 3, shown on the left edge of the container portion of trailer 1. A rear end collapsible vertical frame assembly 9 is disposed in extended on the rear corner of the container portion of trailer 1, between bottom frame 2 and top frame 3, shown on the right edge of the container portion of trailer 1.

In one example, one or more additional collapsible vertical frame assemblies 12 are disposed at intermediate locations from the forward and rear ends of the container portion of trailer 11.

In one example, vertical frame assemblies 9, 10, 12 include articulated vertical frame members. In one example, vertical frame assemblies 9, 10, 12 include one or more locking mechanisms to secure the articulated vertical frame members into the extended position.

A mechanical lifting assembly 4 is disposed between bottom frame 2 and top frame 3. In one example, a set of scissor arms is pivotally attached to bottom frame 2 and top frame 3. In one example, the mechanical lifting assembly is disposed within the side thickness of the rectangular frame members. In one example, a hydraulic arm is pivotally disposed between the bottom or top frame 2, 3 and the scissor arms. In one example, the scissor arms include an extension slide to enable the scissor arms to extend horizontally as the arms collapse vertically.

In one example, locking mechanism members 1012 are disposed on bottom frame 2 and/or top frame 3 to secure the container portion of trailer 1 and its frame assemblies when in the collapsed position. In one example, one or more locking mechanism members 1012 are disposed on bottom frame 2 and secure to top frame 3 when top frame 3 is lowered into the collapsed position.

In one example, top member 31 is disposed on the uppermost portion of top frame 3, forming a ceiling or roof. In one example, top member 31 forms a supporting structural floor on top of collapsible container portion of trailer 1.

Other components are shown in the illustrated example of FIG. 9 to show relative positioning and arrangement of the trailer-container components in the example where a trailer assembly or trailer components are combined with the collapsible container cargo space. The edge of the cargo space floor 21 is shown disposed on bottom frame 2. In one example, forklift slots 1003 are disposed in top frame 3, enabling an external lifting device, such as a forklift, to raise and/or lower top frame 3. In one example, a rear bumper 1004 is affixed to bottom frame 2. In one example, spare tire holder 1008 is affixed to the underside of bottom frame 2. In one example, landing gear 1010 are affixed to bottom frame 2. In one example, a king pin 1014 is affixed to bottom frame 2. Rub rail 1022 is shown disposed along the length of the exterior of rectangular frame 3. In one example, twist lock corner castings 1020 are disposed in the upper corners of frame 3, enabling stacking of containers. In this example, the twist lock corner castings 1020 removably affix a container on top of the collapsible container portion of trailer 1. In one example, power Source and Air Hose Connections 1016 are disposed on an end side of bottom frame 2.

Figure 10:
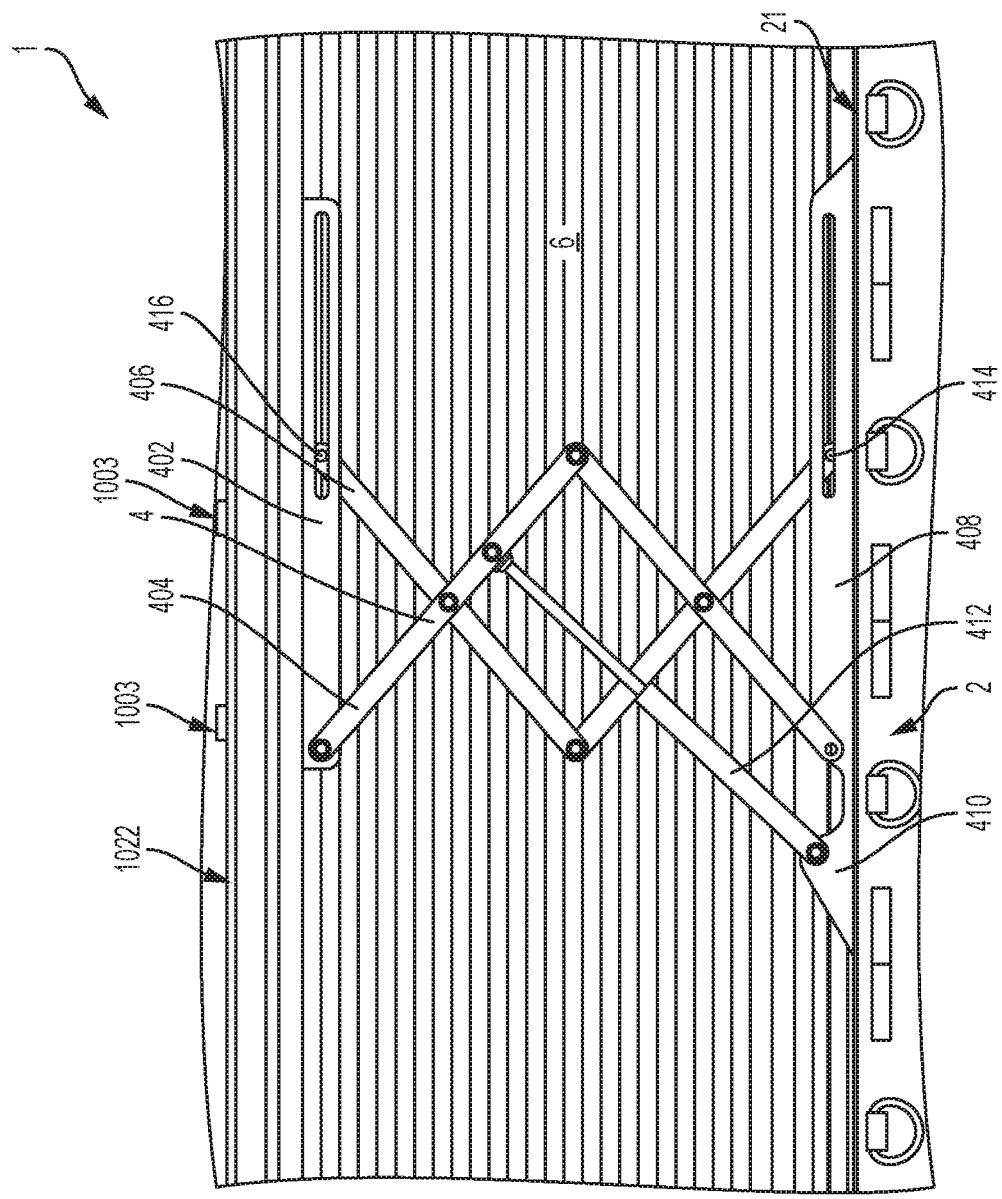
FIG. 10 illustrates a partial side view of an example of the vertically collapsible trailer in extended position, showing an example lifting mechanism.

FIG. 10 illustrates a partial side view of an example of the vertically collapsible trailer 1 in extended position, showing an example lifting mechanism 4. The proximate rolling side wall 6 is not shown; the interior surface of distal rolling side wall 6 is revealed.

In one example, internal mechanical means are provided for raising and lowering the container portion of the trailer. In one example, means include a scissor lift system but could also be achieved, in one example, with a hydraulic arm or, in one example, any other mechanical system that could achieve the same result.

In one example, mechanical lifting assembly 4 is disposed between bottom frame 2 and top frame 3. In one example, a set of scissor arms are pivotally attached to bottom frame 2 and top frame 3. In one example, a bracket member 402 is disposed on top frame 3 for receiving a pivot pin for pivotal attachment of an end of a scissor arm 404. In one example, bracket member 402 is an integral component of top frame 3. Bracket member 402 is the top plate of the mechanical lifting component. In one example, bracket member 402 (or a separate bracket member) includes a horizontally elongated orifice for slidingly receiving a pin for sidling pivotal attachment to a corresponding end of a scissor arm 406. Scissor arms 404 and 406 are pivotally attached at their middles. One or more pairs of scissor arms are joined at ends to form a scissor arm assembly. The opposite ends of the arms of the scissor arm assembly are pivotally attached to a bracket member 408, which is disposed on bottom frame 2. In one example, bracket member 408 is an integral component of top frame 2. Bracket member 408 is the bottom plate of the mechanical lifting component. The end of one arm of the scissor arm assembly is pivotally attached to bracket member 408. In one example, bracket member 408 (or a separate bracket member) includes a horizontally elongated orifice for slidingly receiving a pin for sidling pivotal attachment to a corresponding end of one arm of the scissor arm assembly. In one example, bracket member 408 (or a separate bracket member) includes a pivotal attachment of one end of a hydraulic piston 412. The other end of hydraulic piston 412 is pivotally attached to one of the arms of the scissor arm assembly. In one example, hydraulic piston 412 provides a moderating force to the scissor arm assembly to control the speed of extension or collapse of the container portion of vertically collapsible trailer 1 as well as weight support.

Rub rail 1022 is shown disposed along top frame 3. Forklift slots 1003 are shown disposed in top frame 3.

In one example, mechanical lifting assembly 4 includes one or more locking members to hold the container frame assembly in either a collapsed or fully extended position. In one example, mechanical lifting assembly 4 includes one or more locking members to hold the container frame assembly in a partially extended position.

FIG. 11 illustrates a rear facing view of an example of the vertically collapsible trailer in a partially collapsed position 1", with the rear end cut away to show placement of an example lifting mechanism 4".

A cross-sectional end view of the rolling sidewall barrels 11 are shown disposed in receptacles 61 within top frame 3, defining a thickness of the frame on the sides. The partially extended—partially rolled side walls 6" are partially deployed on the sides of the container portion of trailer 1". The interior side of partially deployed distal forward rolling wall 8" is revealed in this Figure.

In one example, mechanical lifting assembly 4" is disposed between bottom frame 2 and top frame 3. As illustrated in FIG. 11, in one example, a mechanical lifting assembly 4" is disposed on the left side and another mechanical lifting assembly 4" is disposed on the right side of the container frame assembly. In one example, mechanical lifting assembly 4" is disposed within the sides of the container portion of trailer 1", bottom frame 2 and top frame 3 defining a side thickness, enabling a volume of free space within the container. In one example, a frame member 402 is disposed on top frame 3 for receiving a pivot pin for pivotal attachment of an end of a scissor arm assembly. Frame member 402 is the top plate of the mechanical lifting component. The opposite ends of the arms of the scissor arm assembly are pivotally attached to a frame member 408, which is disposed on bottom frame 2. Frame member 408 is the bottom plate of the mechanical lifting component.

In one example, one mechanical lifting assembly 4" is disposed between frame 2 and frame 3, in one example, on one side of the container frame assembly. In one example, a plurality of mechanical lifting assemblies 4" are disposed between frame 2 and frame 3. In one example, one or more mechanical lifting assemblies 4" are disposed on each side of the container frame assembly. In one example, one or more mechanical lifting assemblies 4" are disposed on an end side of the container frame assembly.

In one example, a side wall member 602 is affixed on the exterior side of bottom frame 2.

Other components are shown in the illustrated example of FIG. 11 to show relative positioning and arrangement of the trailer-container components in the example where a trailer assembly or trailer components are combined with the collapsible container cargo space. Rub rail 1022 is shown disposed along the length of the exterior of rectangular frame 3. In one example, top member 31 is disposed on the uppermost portion of top frame 3, forming a ceiling or roof. In one example, top member 31 forms a supporting structural floor on top of collapsible container 1".

Figure 12:
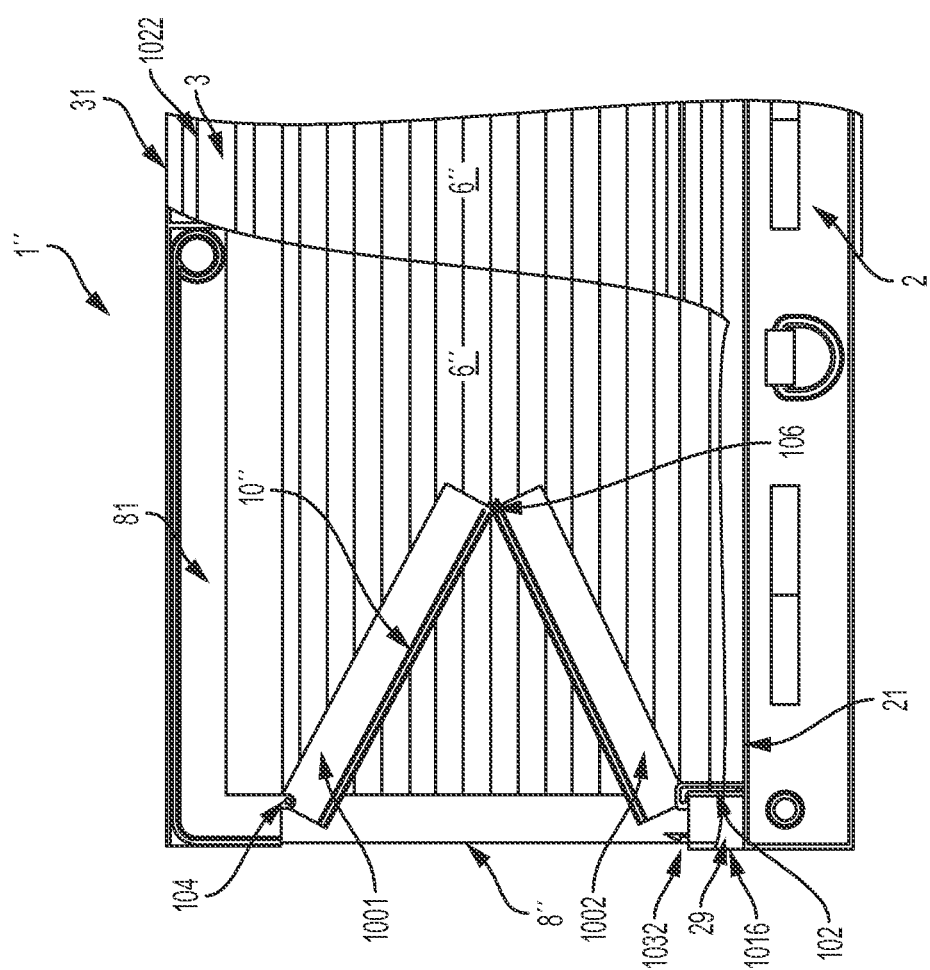
FIG. 12 illustrates a partial forward end side view of an example of the vertically collapsible trailer in partially collapsed position, with near side wall cut-away to show interior mechanism.

FIG. 12 illustrates a partial forward end side view of an example of the vertically collapsible trailer in partially collapsed position 1", with a portion of near side wall 6 and a portion of the front surface of top frame 3 cut-away to show interior mechanism. In one example, the container of vertically collapsible trailer 1" is collapsed by lowering top frame 3 towards bottom frame 2.

In one example, four collapsible vertical frame assemblies 10" are disposed, one at each corner of the container portion of vertically collapsible trailer 1". Together, frame assemblies 10" and top frame 2 and bottom frame 3 form a container.

A forward collapsible vertical frame assembly 10" in this example is shown in a partially collapsed position to show the action of stowing the vertical frame members 1001, 1002 as top frame 3 is lowered towards bottom frame 2. To accomplish this, in one example, vertical frame assembly 10" includes two vertical members 1001, 1002 attached by a hinge 106 that is positioned and arranged to enable the two members to articulate. In one example, the frame members 1001, 1002 of frame assembly 10" are square or rectangular or polygon posts of desired length, the square or rectangular or polygon shape in the cross section. The vertical members 1001, 1002 rotate relative to each other about hinge 106, enabling an external side of each of members 1001, 1002 to come together. As members 1001, 1002 articulate about hinge 106, the members rotate from a vertical position to a more horizontal position.

The top member 1001 of the vertical frame assembly 10" is attached by a hinge 104 to top frame 3. The hinge 104 is positioned and arranged to enable the top member of frame assembly 10" to articulate from top frame 3. In one example, hinge 104 is disposed on a side wall of the polygon shaped cross section of the frame member 1001 that is opposite from the side wall having disposed hinge 106, enabling the top frame member 1001 to articulate upward, rotating towards top frame 3 as top frame 3 lowers.

The bottom member 1002 of the vertical frame assembly 10" is attached by a hinge 102 to bottom frame 2. The hinge 102 is positioned and arranged to enable the bottom member 1002 of frame assembly 10" to articulate from bottom frame 2. In one example, hinge 102 is disposed on a side wall of the polygon shaped cross section of the frame member 1002 that is opposite from the side wall having disposed hinge 106, enabling the bottom frame member 1002 to articulate downward, rotating towards bottom frame 2 as top frame 3 lowers.

In one example, bottom frame 2 includes a corner stand-off 29 to support frame assembly 10" (bottom frame member 1002) in the extended, upright vertical position. Hinge 102 is attached to the stand-off 29, the stand-off provisioning vertical height space for stowage of the lower member 1002 of frame assembly 10".

In one example, hinge 102 includes a J-slide to enable the hinge pin of hinge 102 to translate the lower frame member 1002 of frame assembly 10" down to meet bottom frame 2 for horizontal stowage.

In one example, one or both frame members 1001, 1002 stow into a receiving space within bottom or top frames 2, 3.

In the various examples, the articulated vertical frame members 1001, 1002 of vertical frame assemblies 10" and top rectangular frame 3 and bottom rectangular frame 2 form a container frame assembly. The articulated vertical frame members 1001, 1002 of vertical frame assemblies 10" are positioned and arranged to retract to within the container frame assembly as frame 3 is lowered towards frame 2.

In one example, a frame locking mechanism 1032 is disposed on bottom frame 2 and/or lower frame member 1002 of frame assembly 10", with a corresponding receptacle for receiving locking member 1032 on frame member 1002 or bottom frame 2. In one example, locking member 1032 is disposed on corner stand-off 29 of bottom frame 2. Locking mechanism 1032 secures frame assembly 10" when frame assembly 10" is in the upright position, for example, when the container or trailer assembly is in the fully extended position. In one example, locking mechanism member 1032 is disposed on top frame 3 and/or frame member 1001 of frame assembly 10", with a corresponding receptacle for receiving locking member 1032 on frame member 1001 or top frame 3. In one example, locking mechanism member 1032 is disposed on frame member 1001 for securing to frame member 1002, with a corresponding receptacle member for receiving locking member 1032 on frame member 1002. In one example, locking mechanism member 1032 is disposed on frame member 1002 for securing to frame member 1001, with a corresponding receptacle member for receiving locking member 1032 on frame member 1001. In one example, a plurality of locking mechanisms 1032 is disposed on frame assembly 10" and/or top frame 2 and/or bottom frame 3. In one example, locking mechanism 1032 has corresponding locking structure on each of both members that are being secured. In one example, the locking mechanism is operated manually. In one example, the locking mechanism is automatic. In one example, the locking mechanism is operable either manually or automatically.

A storage receptacle 81 for forward rolling wall 8" is disposed within top frame 3. In the partially collapsed position, forward rolling wall 8" is partially or fully stowed in storage receptacle 81. In one example, storage receptacle 81 is disposed within bottom frame 2, enabling stowage of forward rolling wall 8" downward into the bottom of the container rather than upward towards the top of the container.

Other components are shown in the illustrated example of FIG. 12 to show relative positioning and arrangement of the container components of a collapsible container cargo space. Power Source and Air Hose Connections 1016 are disposed on an end side of bottom frame 2 in one example. The location of a bottom member, cargo space floor 21 is shown edgewise, disposed on bottom frame 2. In one example, top member 31 is disposed on the uppermost portion of top frame 3, forming a ceiling or roof. In one example, top member 31 forms a supporting structural floor on top of collapsible container portion of trailer 1".

Lifting Mechanism.

In one example, the collapsible container is self-erecting by use of the lifting mechanism. In one example, the lifting mechanism is a hydraulic arm instead of a scissor lift system. In one example, a motor operates the mechanical lifting mechanism and, in one example, the motor is located outside the trailer. In one example, the lifting mechanism includes a motor disposed exterior to the frame assembly. In one example, a motor that operates the mechanical lifting mechanism is located underneath the trailer. In one example, the lifting mechanism of the self-erecting collapsible container includes a motor disposed beneath the lowermost rectangular frame member of the frame assembly. In one example, a portion of the lifting mechanism is located outside of the frame assembly. In one example, the size, location, and type of fuel and power for the motor is determined by the type of lifting mechanism that is used.

In one example, the lifting mechanism is operable under various types of power: electricity, and/or pneumatic air, and/or manually. In one example, the lifting mechanism includes means for receiving power to actuate the lifting mechanism. In one example, the container includes means for receiving both pneumatic power and electrical power to actuate the lifting mechanism. In one example, the lifting mechanism includes an electrically powered motor. In one example, the lifting mechanism includes a pneumatically powered piston. In one example, the lifting mechanism comprises means for selectively receiving either pneumatic power or electrical power to actuate the lifting mechanism.

In one example, the container portion is raised or lowered (extended or collapsed) without power with the assistance of an external lifting device, in one example, by forklift, in one example, by crane. In one example of the self-erecting collapsible container, the container is positioned and arranged for raising or lowering with the assistance of an external lifting mechanism. In one example, receptacles are disposed for receiving a lifting device. In one example, receptacles are disposed for receiving a forklift. In one example, receptacles are disposed for receiving a crane.

In one example, a means for elevating the rectangular frames from each other is provided. Examples of means for elevating include: a scissor lift system positioned and arranged to elevate the rectangular frame members from each other, a Screw Jack, Multiple Stage Elevators, a Bell Crank, a non-pneumatic scissor using gears, chains or pulleys, a telescoping arm or boom, a mechanical arm or jib, a 4 bar lifter, a linear actuator powered 4 bar lifter with a bell crank.

In one example, motorized components are used for the mechanical lifting mechanism. In examples, this motor may vary in size, location, and type of fuel and power depending on the type of lifting mechanism that is used. In one example the motorized components are mounted under the trailer frame.

Further examples to summarize and illustrate are provided. In one example, the frame assembly is capable of bearing a load when in the collapsed position. In one example, the container conforms to international standards of size, shape and weight requirements set forth for shipping containers. In one example, the frame assembly is attached to a trailer assembly meeting the standards set forth by the trucking regulatory agency in which the trailer is operating. In one example, the container when in the collapsed position is capable of being used as a Flat Rack container.

In one example of the self-erecting collapsible container, the frame assembly is attached to a railcar assembly ("freight car" or "goods wagon") for transportation of goods via railway, in one example, meeting the standards set forth by the railroad regulatory agency in which the railcar is operating. The Federal Railroad Administration (FRA), for example, regulates the U.S. railroads. In one example, the container conforms to Mexico standards. In one example, the container conforms to Canada standards.

In one example of the self-erecting collapsible container, the frame assembly is attached to a box truck assembly, in one example, meeting the standards set forth by the regulatory agency in which the truck is operating. A box truck, in examples, is also known as a cube truck, cube van, box van, or straight truck, is a truck with a cuboid-shaped cargo area. Box trucks currently typically range in size 4 to 7 meters in length, with smaller or larger sizes existing, but currently being rare in North America. Box trucks usually have a garage door-like rear door that rolls up. On some box trucks, the cargo area is accessible from the cab through a small door. Box trucks currently are usually used by companies that need to haul appliances or furniture. They are also used as moving trucks which can be rented from companies. In the U.S., the Department of Transportation regulates their specifications.

In one example of the self-erecting collapsible container, the frame assembly is attached to a personal trailer assembly to be hitched to a personal vehicle, in one example, meeting the standards set forth by the regulatory agency in which the trailer is operating. There are a few different types of "personal trailers". In the U.S., these also currently fall under the DOT's regulations. For example, a full-trailer is the U.S. term for a freight trailer supported by front and rear axles and pulled by a drawbar. In Europe, this is known as an "A-Frame drawbar trailer". A full-trailer is 96 or 102 in (2,438 or 2,591 mm) wide and 35 or 40 ft (10.67 or 12.19 m) long. In another example, a "close-coupled" trailer is fitted with a rigid towbar which projects from its front and hooks onto a hook on the tractor. It does not pivot as a drawbar does. For a "ball and socket trailer", a trailer coupler is used to secure the trailer to the towing vehicle. The trailer coupler attaches to the trailer ball. This forms a ball and socket connection to allow for relative movement between the towing vehicle and trailer while towing over uneven road surfaces. "Fifthwheel and Goose neck trailers" are available for loads between 10,000 and 30,000 pounds. They are used for larger trailers and provide considerably more stability than does a traditional hitch. Both styles have trailers attach to a coupler mounted above the axle within the bed of the tow vehicle such as a flat deck or pickup truck. In one example, the personal trailer is a full-trailer. In one example, the personal trailer is an A-Frame drawback trailer. In one example, the personal trailer is a close-coupled trailer. In one example, the personal trailer is a ball-and-socket trailer. In one example, the personal trailer is a fifth-wheel trailer. In one example, the personal trailer is a goose-neck trailer. In one example, the trailer and collapsible container are configured for the container to be removable from the trailer. In one example, the collapsible container is integral to the trailer.

In one example, end walls are positioned and arranged to fold in the inward direction.

In one example, a vertical height locking mechanism is attached to relieve the scissor jack when in the extended (full-vertical) position.

In one example, the top/roof of the collapsible semi-truck trailer has a risible "nub" or risible twist lock to receive a bottom socket of a shipping container, in one example, enabling a shipping container to ride on top of the collapsed flat bed and locked in place.

In one example, sockets for twist locks to receive shipping containers are also disposed on the top/roof of the collapsible semi-truck trailer.

In one example, the frame assembly is attached to a box truck assembly meeting the standards set forth by the regulatory agency in which the truck is operating. In one example, a locking mechanism is included to lock the frame assembly in place when in the collapsed position.

In one example, one or more of the side or end walls is able to open as a door for access to the cargo space in the raised position.

In one example, a refrigeration unit is attached temporarily or permanently to move temperature sensitive cargoes. In one example, the frame assembly is configured to receive a refrigeration unit. In one example, a refrigeration unit is attached to the forward rolling door. In one example, the unit is attached in such a manner that it resides in the space where the part of the door that stays attached while it is rolling up or down is attached to the refrigeration unit and not directly on the top or bottom frame. In one example, a refrigeration unit disposed outside of a perimeter of the frame assembly. In one example, a refrigeration unit disposed within the frame assembly.

In one example, a GPS and communication system is attached to the container or trailer assembly. In one example, the GPS is disposed within the frame assembly. In one example, an identification system is attached to the container or trailer assembly. In one example, the identification system is disposed within the frame assembly. In one example, an RFID system is disposed on or within the container.

Operation.

In one example, one or more containers are stacked on a transportation vehicle, enabling one vehicle to move more than one container at a time. In one example, a trailer with a vertically collapsible container has one or more containers placed on top of the vertically collapsible container, in one example, with the vertically collapsible container in the collapsed position. In one example, the vertically collapsible container is integrated into the bed of the trailer. In one example, the vertically collapsible container is attached to the trailer, but is removable from the trailer. In one example, two or more collapsible containers are placed, one on top of the other, on a flat bed trailer. In one example, non-collapsible containers are stacked along with one or more collapsible containers. In one example, corner castings are disposed on the containers, positioned and arranged so that the containers are removably affixed to one another when stacked. In one example, a combination of 20-foot and 40-foot containers are positioned and arranged to stack on one another, for example, two 20-foot containers end-to-end stacked on or under either a 40-foot container or two other 20-foot containers that are also placed end-to-end. In one example, one or more of the stacked containers is a vertically collapsible container in a collapsed position. In one example, the vertically collapsible container(s) is described in one of the examples disclosed herein.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention.

The invention claimed is:

1. A collapsible container comprising:
   a frame assembly comprising:
      a plurality of rectangular frame members having a longitudinal length and a width;
      a plurality of articulated vertical frame members disposed between the rectangular frame members;
      wherein at least one rectangular frame member comprises a receptacle member included within the rectangular frame member in the length direction;
      wherein at least one rectangular frame member comprises a receptacle member included within the rectangular frame member in the width direction; and
      wherein the articulated vertical frame members are positioned and arranged to retract to within the frame assembly;
   a lifting mechanism positioned and arranged to elevate the rectangular frame members from each other;
   a retractable side wall positioned and arranged to retract into the receptacle member in the length direction;
   a retractable end wall positioned and arranged to retract into the receptacle member in the width direction;
   a top member disposed on an uppermost rectangular frame member of the frame assembly; and
   a bottom member disposed on a lowermost rectangular frame member of the frame assembly;
   wherein the lifting mechanism is disposed between the uppermost rectangular frame member of the frame assembly and the lowermost rectangular frame member of the frame assembly; and
   wherein the lifting mechanism is disposed within the side thickness of the uppermost rectangular frame member of the frame assembly and the lowermost rectangular frame member of the frame assembly.

2. The container of claim 1 wherein the lifting mechanism is disposed along the length direction of the rectangular frame members.

3. The container of claim 1 wherein the lifting mechanism is disposed along the width direction of the rectangular frame members.

4. The container of claim 1 wherein the top member is pre-engineered to receive at least one additional frame assembly.

5. The container of claim 1 wherein the container is attached to a trailer.

6. The container of claim 1 wherein the lowermost rectangular frame member is integrated into a trailer assembly.

7. The container of claim 1 wherein the frame assembly is attached to a railcar assembly or goods wagon, configured and arranged for transportation of goods via railways.

8. The container of claim 1 wherein the frame assembly is attached to a box truck.

9. The container of claim 1 wherein a portion of the lifting mechanism is disposed outside of a perimeter of the frame assembly.

10. The container of claim 1 further comprising at least one lock member positioned and arranged to lock the rectangular members of the frame assembly in place when the frame assembly is in a collapsed position.

11. The container of claim 1 wherein the lifting mechanism comprises a receptacle for receiving power to actuate the lifting mechanism.

12. The container of claim 1 wherein the lifting mechanism is attached to the uppermost rectangular frame member of the frame assembly and attached to the lowermost rectangular frame member of the frame assembly.

13. The container of claim 1 wherein the lifting mechanism is configured to self-erect the container.

14. The container of claim 1 wherein the lifting mechanism comprises a set of scissor arms pivotally attached between two of the plurality of rectangular frame members.

15. A collapsible container comprising:
a frame assembly comprising:
a plurality of rectangular frame members having a longitudinal length and a width;
a plurality of articulated vertical frame members disposed between the rectangular frame members;
wherein at least one rectangular frame member comprises a receptacle member included within the rectangular frame member in the length direction;
wherein at least one rectangular frame member comprises a receptacle member included within the rectangular frame member in the width direction; and
wherein the articulated vertical frame members are positioned and arranged to retract to within the frame assembly;
a lifting mechanism positioned and arranged to elevate the rectangular frame members from each other;
a retractable side wall positioned and arranged to retract into the receptacle member in the length direction;
a retractable end wall positioned and arranged to retract into the receptacle member in the width direction;
a top member disposed on an uppermost rectangular frame member of the frame assembly; and
a bottom member disposed on a lowermost rectangular frame member of the frame assembly;
wherein the lifting mechanism is disposed between the uppermost rectangular frame member of the frame assembly and the lowermost rectangular frame member of the frame assembly; and
wherein the articulated vertical frame members comprise:
an assembly of two vertical members attached by a hinge that is positioned and arranged on a first side of the two vertical members, whereby the two members rotate relative to each other about the hinge,
wherein a first vertical member of the two vertical members is pivotally attached to a first rectangular frame member of the plurality of rectangular frame members,
wherein a second vertical member of the two vertical members is pivotally attached to a second rectangular frame member of the plurality of rectangular frame members, and
wherein the pivotal attachments to the rectangular frame members are disposed on a second side of the respective two vertical members opposite from the side of the attached hinge, whereby the first vertical member is rotatable towards the first rectangular frame member and the second vertical member is rotatable towards the second rectangular frame member, urging the hinged first sides together.

16. The container of claim 15 wherein the lifting mechanism is disposed along the length direction of the rectangular frame members.

17. The container of claim 15 wherein the lifting mechanism is disposed along the width direction of the rectangular frame members.

18. The container of claim 15 wherein the top member is pre-engineered to receive at least one additional frame assembly.

19. The container of claim 15 wherein the container is attached to a trailer.

20. The container of claim 15 wherein the lowermost rectangular frame member is integrated into a trailer assembly.

21. The container of claim 15 wherein the frame assembly is attached to a railcar assembly or goods wagon, configured and arranged for transportation of goods via railways.

22. The container of claim 15 wherein the frame assembly is attached to a box truck.

23. The container of claim 15 wherein a portion of the lifting mechanism is disposed outside of a perimeter of the frame assembly.

24. The container of claim 15 further comprising at least one lock member positioned and arranged to lock the rectangular members of the frame assembly in place when the frame assembly is in a collapsed position.

25. The container of claim 15 wherein the lifting mechanism comprises a receptacle for receiving power to actuate the lifting mechanism.

26. The container of claim 15 wherein the lifting mechanism is attached to the uppermost rectangular frame member of the frame assembly and attached to the lowermost rectangular frame member of the frame assembly.

27. The container of claim 15 wherein the lifting mechanism is configured to self-erect the container.

28. The container of claim 15 wherein the lifting mechanism comprises a set of scissor arms pivotally attached between two of the plurality of rectangular frame members.

* * * * *